(12) United States Patent
Seto

(10) Patent No.: US 9,088,765 B2
(45) Date of Patent: Jul. 21, 2015

(54) IMAGE PLAYBACK APPARATUS AND IMAGE DISPLAY CONTROL METHOD

(71) Applicant: Olympus Imaging Corp., Shibuya-ku, Tokyo (JP)

(72) Inventor: Kazushige Seto, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 224 days.

(21) Appl. No.: 13/716,825

(22) Filed: Dec. 17, 2012

(65) Prior Publication Data

US 2013/0101268 A1    Apr. 25, 2013

Related U.S. Application Data

(63) Continuation of application No. 12/731,978, filed on Mar. 25, 2010, now Pat. No. 8,334,920.

(30) Foreign Application Priority Data

Mar. 27, 2009   (JP) ................. 2009-080015

(51) Int. Cl.
*H04N 5/222* (2006.01)
*H04N 5/228* (2006.01)
*H04N 9/87* (2006.01)
*G11B 27/34* (2006.01)
*H04N 5/77* (2006.01)
*H04N 9/82* (2006.01)

(52) U.S. Cl.
CPC ................. *H04N 9/87* (2013.01); *G11B 27/34* (2013.01); *H04N 5/772* (2013.01); *H04N 9/8205* (2013.01)

(58) Field of Classification Search
CPC .......... H04N 5/23248; H04N 5/23258; H04N 5/232; H04N 5/23254; H04N 5/23293; H04N 5/2628; H04N 5/772; H04N 2101/00; G11B 31/006
USPC ........ 348/333.01–333.12, 239, 208.99–208.3
See application file for complete search history.

(56) References Cited

U.S. PATENT DOCUMENTS

| 7,848,546 B2 | 12/2010 | Ohno et al. |
| 8,334,920 B2 * | 12/2012 | Seto .......................... 348/333.05 |
| 2009/0153678 A1 * | 6/2009 | Nonaka et al. ............. 348/208.4 |

FOREIGN PATENT DOCUMENTS

| CN | 1928888 | 3/2007 |
| JP | 2006-091294 | 4/2006 |

OTHER PUBLICATIONS

Final Decision of Rejection for Chinese Patent Application No. 201010148117.6, mailed Mar. 4, 2013 (11 pgs.).

* cited by examiner

*Primary Examiner* — Tuan Ho
*Assistant Examiner* — Selam Gebriel
(74) *Attorney, Agent, or Firm* — John C. Pokotylo; Straub & Pokotylo

(57) ABSTRACT

An image playback apparatus has a recording section which records shot images, and a display section which displays the images. The apparatus includes a motion detection section which detects a motion applied to the image playback apparatus in a state where hold of the image playback apparatus is detected, and a display control section which, when application of a particular motion set in advance is detected by the motion detection section, sorts and displays the images displayed on the display section.

14 Claims, 21 Drawing Sheets

EXAMPLE OF IMAGE SORTING

| | IMAGE 1 | IMAGE 2 | IMAGE 3 | IMAGE 4 | IMAGE 5 |
|---|---|---|---|---|---|
| SORTING RESULTS | SNAP | SNAP | LANDSCAPE | SNAP | SNAP |
| NUMBER OF FACES | 2 | 3 | | 1 | 2 |
| PRINCIPAL COLOR | GREEN | WHITE | | BLACK | WHITE |
| POSITION, FEATURE AND SIZE OF FACE | | | | | |
| A1 | | | | | |
| A2 | | | | | |
| A3 | | | | | |
| A4 | P-A·D2 | | | | |
| A5 | | P-X·D3 | | | P-B·D2 |
| A6 | P-X·D3 | P-B·D3 | | P-A·D1 | P-A·D2 |
| A7 | | | | | |
| A8 | | P-X·D3 | | | |
| A9 | | | | | |
| DAY/TIME, PLACE | 9/15 | 9/15 | 9/15 | 9/15 | 9/15 |

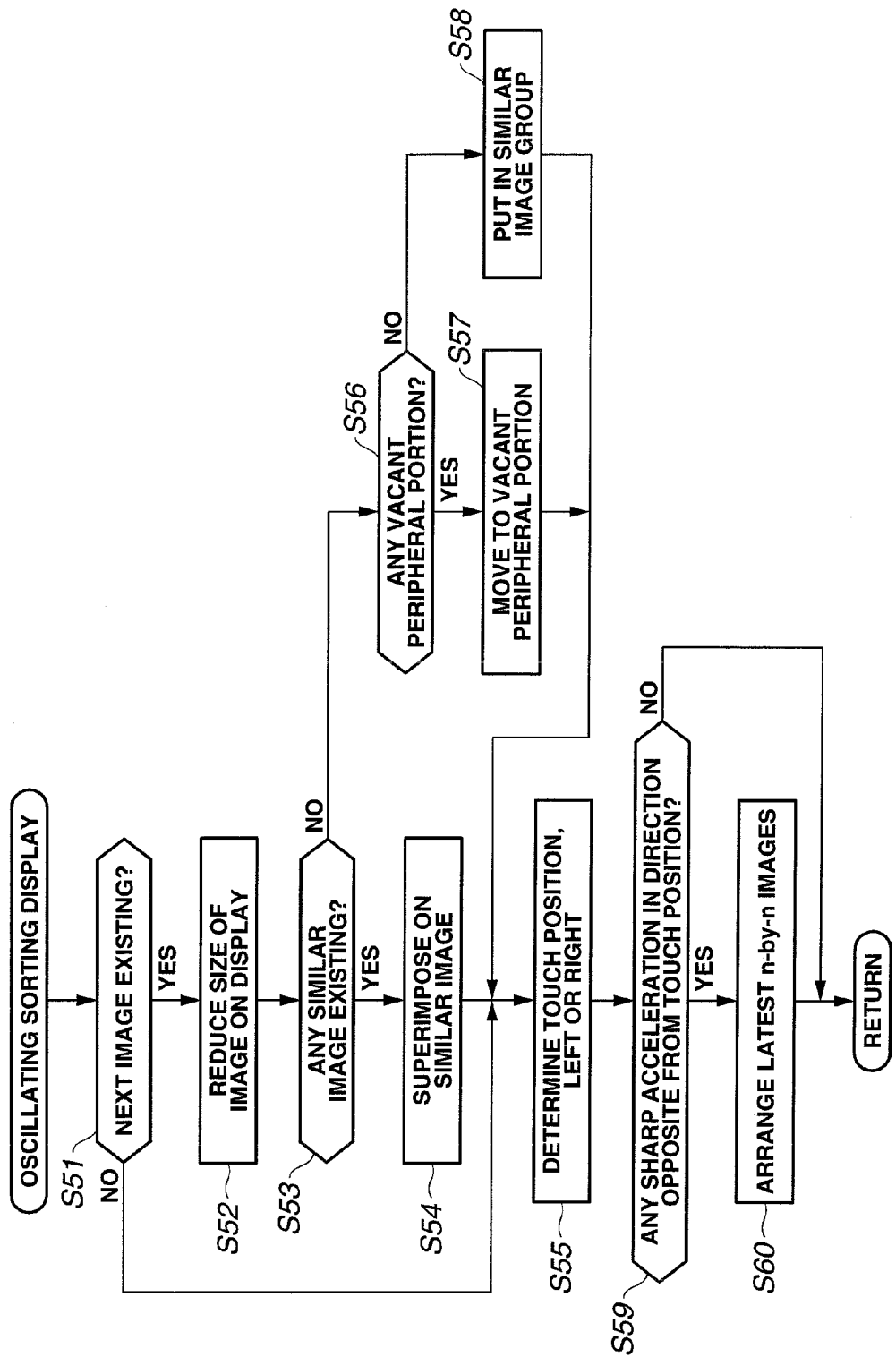

IMAGE PLAYBACK APPARATUS AND IMAGE DISPLAY CONTROL METHOD

CROSS REFERENCE TO RELATED APPLICATION

This application is a continuation application of U.S. patent application Ser. No. 12/731,978 (referred to as "the '978 application" and incorporated herein by reference) filed on Mar. 25, 2010, titled "IMAGE PLAYBACK APPARATUS AND IMAGE DISPLAY CONTROL METHOD," listing Kazushige SETO as the inventor, the '978 application claiming the benefit of Japanese Patent Application No. 2009-080015 (incorporated herein by reference), filed on Mar. 27, 2009, the entire contents of which was incorporated by reference.

BACKGROUND OF THE INVENTION

1. Field of the Invention

The present invention relates to an image playback apparatus such as a digital camera, a video camera, a portable telephone with a camera, a photo viewer or a photo frame, having a function to play back a still image and/or a moving image, and to an image display control method.

2. Description of the Related Art

In recent years, shooting apparatuses (hereinafter referred to as "camera") have been used in some cases as an appliance for storing a large amount of images because of, for example, the increase in capacity of recording units for storing shot images in the cameras. In such a situation, it is difficult to search out a desired image from a large amount of images.

However, each image has a particular feature and a device to sort the images by effectively using the differences between the features of the images enables easy recognition of the images and search for each image.

That is, a camera enables enjoying shooting effects by changing methods of focusing, exposure, etc., at the time of shooting as well as changing image processings on shot images, and it is possible to sort images according to such shooting modes.

In recent years, cameras have also appeared in which the shooting mode is changed by determining a subject and surroundings to be shot by a face detection technique or the like. Further, it is also possible to sort images with respect to shooting dates and positions, the degrees of concentration of shooting times, etc. Shot images can be sorted by various methods, as described above. However, no method has been established as a method for displaying images by effectively utilizing the results of such sorting so that the images can be easily searched by a simple operation. On the other hand, Japanese Patent Application Laid-Open Publication No. 2008-193426 discloses a method in which images are displayed by being placed in crisscross form on a display screen while being logically sorted according to features of the images placed in crisscross form.

SUMMARY OF THE INVENTION

According to the present invention, there is provided an image playback apparatus having a recording section which records shot images, and a display section which displays the images, the apparatus including a motion detection section which detects a motion applied to the image playback apparatus in a state where hold of the image playback apparatus is detected, and a display control section which, when application of a particular motion set in advance is detected by the motion detection section, sorts and displays the images displayed on the display section.

According to the present invention, there is also provided an image playback apparatus having a display section which displays shot images, the apparatus including a motion detection section which detects a motion applied to an exterior body member of the image playback apparatus in which the display section is provided, and a display control section which places the images displayed on the display section at predetermined positions in the display section according to sorting of the images on the basis of a result of detection of a particular motion from the motion detection section.

According to the present invention, there is also provided an image display control method including a first step of detecting whether or not a user is holding an image playback apparatus for playing back images, a second step of detecting a motion applied to the image playback apparatus, and a third step of displaying shot images by placing the images at a plurality of predetermined positions in a display section according to sorting of the shot images when application of a particular motion set in advance is detected in a state where hold of the image playback apparatus by the user is detected.

BRIEF DESCRIPTION OF THE DRAWINGS

FIG. 9 is a flowchart showing an example of a detailed processing procedure for processing as to oscillating sorting shown in FIG. 5;

DETAILED DESCRIPTION OF THE PREFERRED EMBODIMENTS

Embodiments of the present invention will be described with reference to the accompanying drawings.

(First Embodiment)

Figure 1:
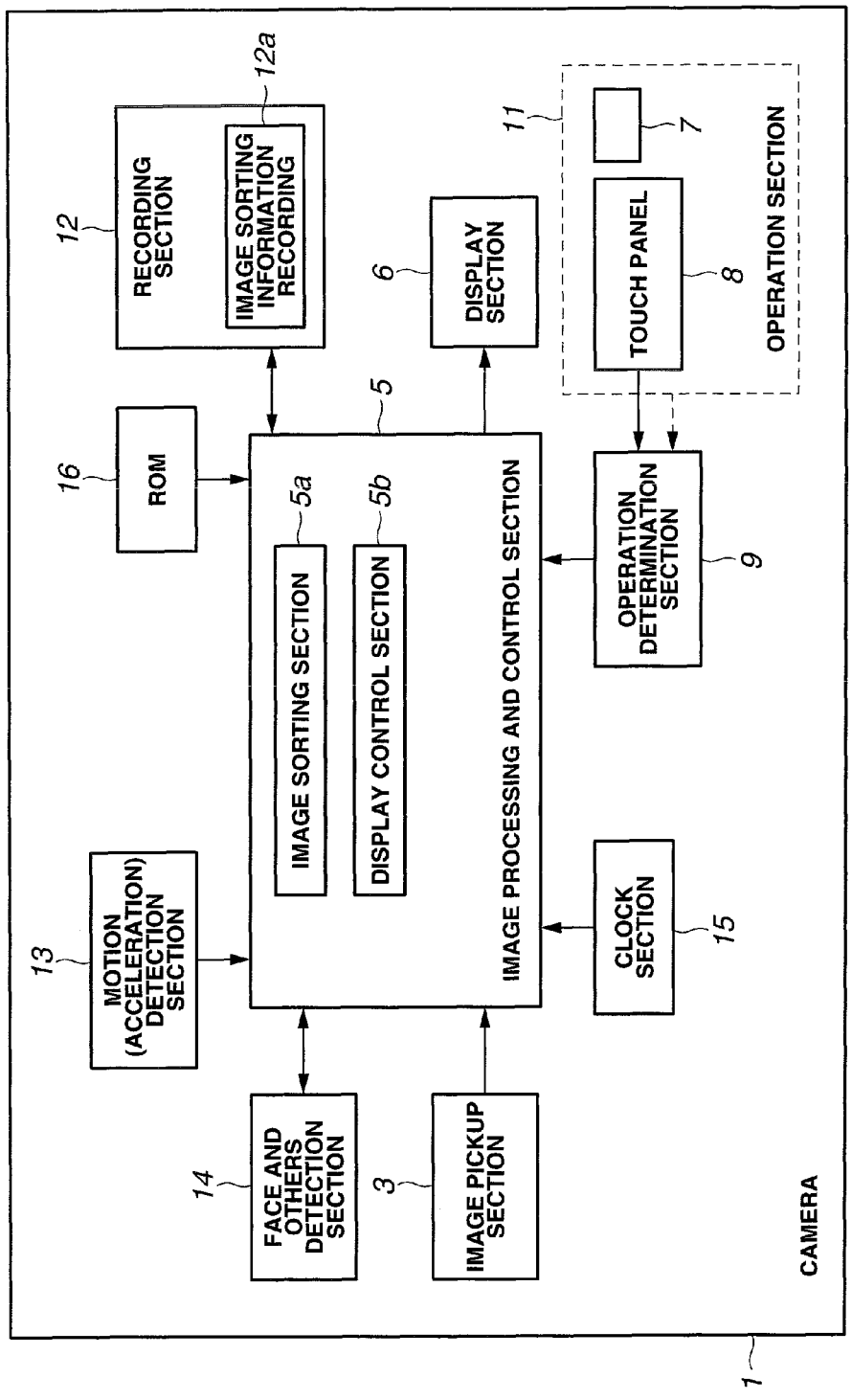
FIG. 1 is a block diagram showing the internal configuration of a camera in a first embodiment of an image playback apparatus of the present invention.
Figure 2:
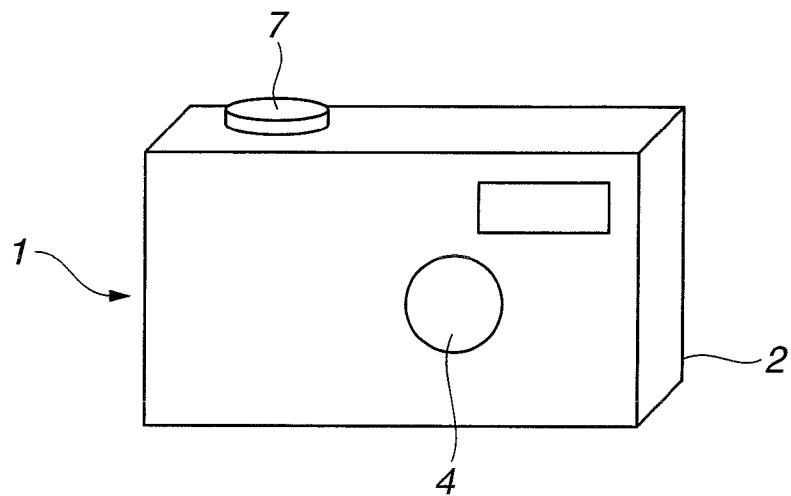
FIG. 2 is a perspective view showing a front side of the camera.

A camera 1 as a shooting apparatus having shooting functions according to a first embodiment of the present invention shown in FIG. 1 has a boxlike shape as shown in FIG. 2. A lens 4 constituting an image pickup section 3 which picks up an image of (shooting) a subject is provided approximately at a center of a front surface of a case 2 provided as an exterior body member of the camera 1.

At a position at which an image is formed by the lens 4, an image pickup device such as a CCD is disposed The lens 4 and the image pickup device form the image pickup section 3 shown in FIG. 1. An image pickup signal picked up by the image pickup section 3 is inputted to an image processing and control section 5 shown in FIG. 1, in which image processing and control are performed.

The image processing and control section 5 performs image processing on the image pickup signal, generates an image signal and outputs the image signal to a display section 6. The display section 6 displays an image corresponding to the image signal.

Figure 3:
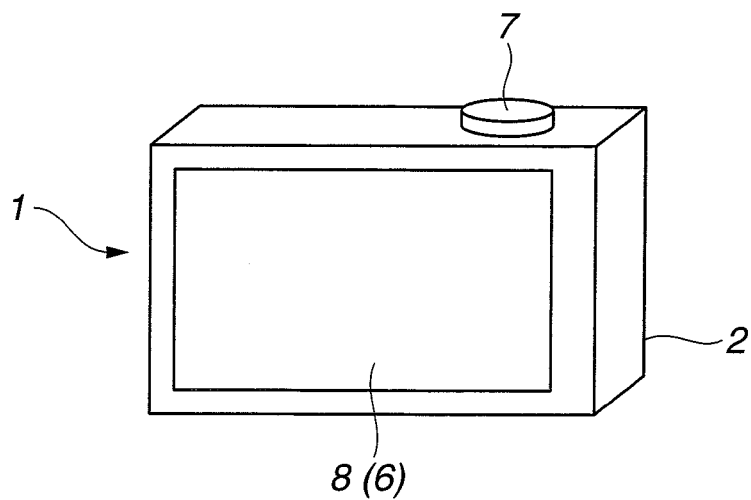
FIG. 3 is a perspective view showing a rear side of the camera.

As shown in FIG. 3, a release button 7 through which a shooting operation is performed is provided at a right-hand position in an upper surface of the case 2. When the release button 7 is operated, an image picked up by the image pickup section 3 is recorded as a shot image.

On the back surface side of the case 2, a touch panel 8 having a function of the display section 6 to display a picked-up image or a shot image and capable of being operated in a touch operation manner is formed in a rectangular size slightly smaller than the entire back surface.

The touch panel 8 has a light receiving element array disposed, for example, in matrix form on the inner surface (back surface) side of a liquid crystal panel forming the display section 6 to detect a position at which an operation is performed in a touching manner. The light receiving element array detects the quantity of incident light entering from the front surface side thereof. When a user performs a touching operation by touching the touch panel 8, the quantity of incident light is changed after the touching operation.

In other words, the quantity of incident light entering the light receiving elements at the operated position is different from the quantities of incident light entering peripheral portions not operated. Therefore the operated position can be detected by the light receiving element array.

A detection signal from the touch panel 8 (the light receiving element constituting the touch panel 8) is inputted to the image processing and control section 5 through an operation determination section 9 shown in FIG. 1. Operation signals from an operation section 11 including the release button 7 are also inputted to the image processing and control section 5 through the operation determination section 9.

The operation determination section 9 detects a position on the touch panel 8 at which the touch panel 8 is touched by a user (touch position) and outputs a determination signal corresponding to the position to the image processing and control section 5. The touch panel 8 forms a touch (hold) position detection section which detects touch (hold) positions. This touch (hold) position detection section has a function of a touch (hold) detection section to detect whether or not a touch (hold) has been given.

Also, the operation determination section 9 determines each of various user operations in the operation section 11 and sends an operation determination result to the image processing and control section 5.

The image processing and control section 5 performs control corresponding to the operation determination result. In the touch panel 8 or the operation section 11, various operating buttons including one for setting a playback mode or the like for playing back and displaying a shot image are provided.

The arrangement may alternatively be such that a detection signal from the touch panel 8 is directly inputted to the image processing and control section 5, and the image processing and control section 5 makes an operation determination corresponding to an operation at a touch position on the touch panel 8 and performs control corresponding to the operation determination result.

A recording section 12 is connected to the image processing and control section 5. When a shooting operation is performed, the image processing and control section 5 records in the recording section 12 an image picked up by the image pickup section 3.

To the image processing and control section 5, a motion (acceleration) detection section 13 (hereinafter referred to as "motion detection section 13") which detects a motion (acceleration) applied to the case 2 provided as an exterior body member of the camera 1 is connected. The motion detection section 13 detects a motion applied to the camera 1 from acceleration acting on the camera 1 by using acceleration sensors described below, and outputs a detection result to the image processing and control section 5.

A face and others detection section 14 is connected to the image processing and control section 5. The face and others detection section 14 performs face detection to detect whether or not an image picked up by the image pickup section 3 includes a face, detects a landscape, etc., other than faces, and outputs detection results to the image processing and control section 5.

A clock section 15 which outputs information on a clock is connected to the image processing and control section 5. When a shooting operation or the like is performed, the image processing and control section 5 records information on the shooting date and time by adding information to an image to be recorded in the recording section 12.

The image processing and control section 5 in the camera 1 according to the present embodiment includes an image sorting section 5a which sorts each of shot images, and a display control section 5b which controls a form of display in which sorted images are displayed on the display section 6.

Image sorting information on sorting of shot images performed by the image sorting section 5a (also referred to as "sorting information") is recorded, for example, in an image sorting information recording area (referred to simply as "image sorting information recording" in FIG. 1) 12a in the recording section 12 by being associated with the shot images.

The image processing and control section 5 is configured, for example, by using a CPU. A program for control performed by the image processing and control section 5 is stored in a ROM 16. When a power supply for the camera 1 is turned on, the image processing and control section 5 performs control operations on the sections constituting the camera 1 according to the control program in the ROM 16.

Figure 4A:
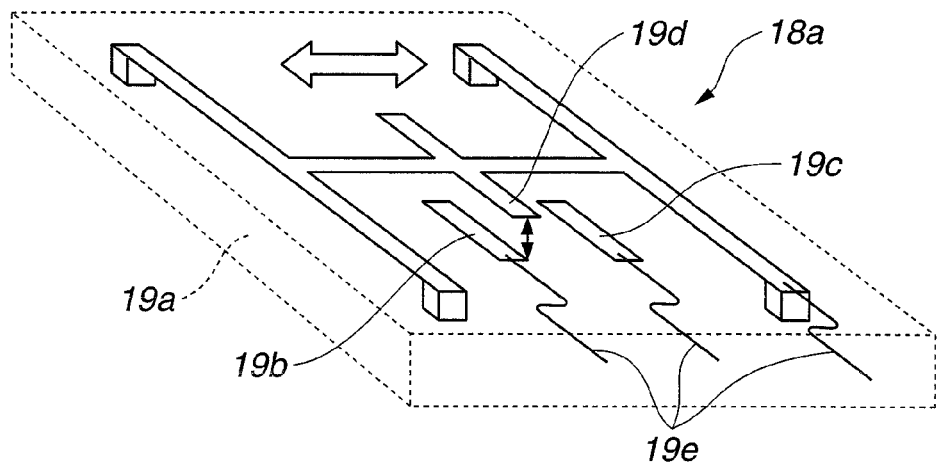
FIG. 4A is diagram schematically showing the structure of an acceleration sensor.

FIG. 4A shows the structure of an acceleration sensor 18a constituting the above-described motion detection section 13. In the acceleration sensor 18a, a movable electrode 19d is provided in a bridge manner over fixed electrodes 19b and 19c provided on a surface of a semiconductor chip substrate 19a, as described below.

By acceleration applied to the acceleration sensor 18a, the electrode 19d in the bridge is moved to produce a change in capacitance between the fixed electrode 19b and the electrode 19d and between the fixed electrode 19c and the electrode 19d.

This structure enables detection of acceleration by monitoring the change in capacitance or voltage.

In the acceleration sensor 18a, supporting portions projecting from the surface of the semiconductor chip substrate 19a are formed at two left-hand positions and two-right hand positions set bilaterally symmetrically. End portions of two electrode strips are respectively fixed on upper surfaces of the supporting portions.

An electrode strip extending in a left-right direction spans between the two electrode strips disposed left and right so as to connect the two electrode strips at centers of the same. The electrode 19d extending in the longitudinal direction perpendicular to the left-right direction is formed at a center of the electrode strip spanning between the two electrode strips disposed left and right.

The fixed electrodes 19b and 19c are formed at positions on the surface of the semiconductor chip substrate 19a respectively shifted by a predetermined distance in leftward and rightward directions from a position opposed to the electrode 19d.

The electrode 19d and the fixed electrodes 19b and 19c are respectively connected electrically to signal lines 19e.

In this acceleration sensor 18a, the electrode 19d and the fixed electrodes 19b and 19c are set so that the capacitance between the electrode 19d and the fixed electrode 19b and the capacitance between the electrode 19d and the fixed electrode 19c are equal to each other when no acceleration acts on the acceleration sensor 18a in the left-right direction.

For example, when a user applies acceleration in the rightward direction to the semiconductor chip substrate 19a on which the acceleration sensor 18a is provided, by performing a tapping (striking) operation, such as striking with his/her finger from the right-hand side and stops the operation (application of the acceleration), the capacitance between the electrode 19d and the fixed electrode 19b first increases and then decreases immediately before settling.

Figure 4B:
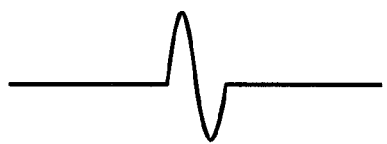
FIG. 4B is a diagram showing changes in waveform as changes in capacitance between electrodes when a rightward striking motion is applied to the acceleration sensor.

On the other hand, the change in capacitance between the electrode 19d and the other fixed electrode 19c is the reverse of that described above. FIG. 4B shows an example of the change in capacitance or voltage between the electrode 19d and the fixed electrode 19b in this case.

Figure 4C:
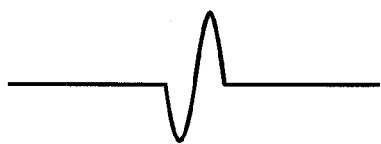
FIG. 4C is a diagram showing changes in waveform as changes in capacitance between electrodes when a striking motion is applied in the opposite direction of FIG. 4B to the acceleration sensor.

When a user applies acceleration in the leftward direction by performing a tapping operation on the semiconductor chip substrate 19a from the left-hand side and stops the operation, the capacitance between the electrode 19d and the fixed electrode 19b first decreases and then increases immediately before settling. FIG. 4C shows an example of the change in capacitance or voltage between the electrode 19d and the fixed electrode 19b in this case.

It is, therefore, possible to detect either of an acceleration applied in the leftward direction and an acceleration applied in the rightward direction and the magnitude of the acceleration by monitoring the capacitance between these electrodes.

Figure 4D:
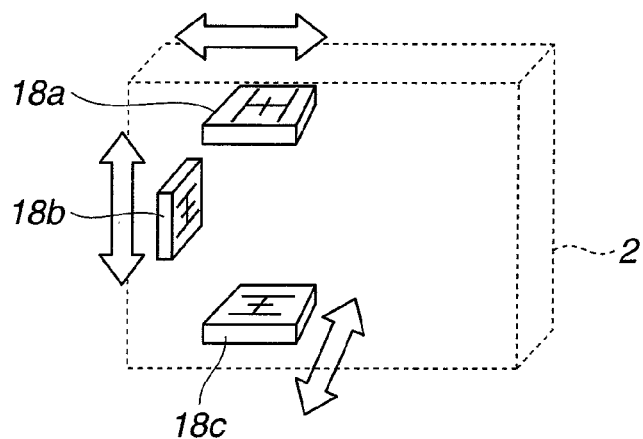
FIG. 4D is a diagram showing the provision of acceleration sensors for motion detection in three directions perpendicular to each other.

In the present embodiment, acceleration sensors 18a, 18b, and 18c disposed in three places on the camera 1 as shown in FIG. 4D respectively detect accelerations acting in the horizontal (width) direction, the vertical (height) direction and the depth direction (the direction parallel to the optical axis of the lens 4).

From detection signals from the three acceleration sensors 18*a*, 18*b*, and 18*c*, a motion such as a tap and an oscillatory motion (a shake) accompanying a change in acceleration acting on the camera 1 can be three-dimensionally detected.

The detection signals from the three acceleration sensors 18*a*, 18*b*, and 18*c* are inputted to a motion detection circuit in the motion detection section 13. This motion detection circuit detects an acceleration, detects a motion such as a tap or an oscillatory motion from changes in the acceleration and outputs a detection signal to the image processing and control section 5.

The acceleration sensor 18*a* is capable of detecting the acceleration of the gravity and is, therefore, capable of detecting in which direction the camera 1 is directed. For example, if the acceleration sensor 18*a* is parallel to the horizontal plane in FIG. 4D, end portions of the electrode 19*d* are deformed by the acceleration of the gravity so as to bend downward.

Therefore, the capacitance between the fixed electrode 19*b* and the electrode 19*d* in the acceleration sensor 18*a* is increased relative to that in the acceleration sensor 18*b* disposed parallel to the direction of the gravity. The image processing and control section 5 uses the function of detecting the acceleration of the gravity with the motion detection section 13 as described above to determine whether or not the direction in which the display screen of the display section 6 faces is, for example, a downward direction to be excluded, as described below.

However, exclusion of the downward direction may be avoided by considering a case where a user views (appreciates) images while lying on his or her back. In such a case, when an oscillatory motion of the camera 1 is produced while the display screen is facing downward, the image processing and control section 5 performs processing corresponding to the oscillatory motion.

In the present embodiment, as described above, image sorting information (also referred to as "sorting information") for sorting is recorded in the recording section 12 by being added to each shot image.

When setting in the playback mode is made to display shot images, the image processing and control section 5 determines, by using detection through the motion detection section 13, whether or not a user is applying a particular motion to the camera 1.

When the image processing and control section 5 detects, for example, an oscillatory motion (a shake) as a particular motion, it performs a control operation to display, by using image sorting information, images to be displayed on the display section 6 according to sorting shown by the sorting information, by moving (placing) the images to a plurality of predetermined positions such as peripheral portions in the display screen of the display section 6.

By enabling use of such a display form, images are sorted and displayed on the display section 6 by a simple operation so as to be easily searched. In this way, improved operability is realized.

Also, in the present embodiment, the display control section 5*b* displays, on the basis of a result of detection of application of a particular motion, shot images according to sorting corresponding to image sorting information by reducing the images in size, collecting together the images similar to each other in the display section 6 and placing the images at a plurality of predetermined positions. Further, the display control section 5*b* performs display control corresponding to detection of a second motion such as a tap different from the particular motion.

Also, when the display control section 5*b* in the image processing and control section 5 detects this second motion by using the motion detection section 13, it displays the images, that have been displayed by being placed at the plurality of predetermined positions, by putting the images in an image display form different from that used by display control in the case where application of the particular motion is detected, e.g., one in which the images are orderly arranged in the display screen of the display section 6.

A control process in which the camera 1 is controlled by the image processing and control section 5 according to the present embodiment will be described with reference to FIG. 5. When the power supply for the camera 1 is turned on, the control process on the camera 1 is started. In first step S1, the image processing and control section 5 determines whether or not an operation to turn off the power supply has been performed. If this operation has been performed, the image processing and control section 5 turns off the power supply and ends this control process.

If the power supply has not been turned off, the image processing and control section 5 determines in next step S2 whether or not setting to the shooting mode has been made. If setting in the shooting mode has been made, the image processing and control section 5 operates the face and others detection section 14 in step S3 to perform detection of a face and other things.

In subsequent step S4, the image processing and control section 5 performs exposure computation. Thereafter, in the exposing state, the image processing and control section 5 performs control so that an image picked up by the image pickup section 3 is displayed as a through image by the display section 6, as shown in step S5.

In subsequent step S6, the image processing and control section 5 determines whether or not a release operation has been performed. If no release operation has been performed, the process returns to step S1.

If a release operation has been performed, the image processing and control section 5 performs shooting and recording processing in step S7. That is, the image processing and control section 5 records in the recording section 12 the image obtained when the release operation is performed.

In subsequent step S8, the image processing and control section 5 performs image sorting processing by means of the image sorting section 5*a*, as described below with reference to FIG. 6.

In subsequent step S9, after image sorting, the image processing and control section 5 records image sorting information as information of the result of sorting in an image sorting information recording area 12*a* in the recording section 12. The image processing and control section 5 returns to processing in step S1 after processing in step S9.

If the image processing and control section 5 determines in step S2 that the present mode is not the image shooting mode, it determines in step S10 whether or not setting in the playback mode has been made. If the present mode is not the playback mode, the image processing and control section 5 returns to processing in step S1.

If setting in the playback mode has been made, the image processing and control section 5 performs in subsequent step S11 control for displaying on the display section 6 a last image lastly recorded in the recording section 12. In subsequent step S12, the image processing and control section 5 determines through the operation determination section 9 whether or not any other display (button) operation has been performed.

If a display operation has been performed, the image processing and control section 5 determines whether or not the display operation is an operation to display thumbnail images (referred to simply as "thumbnails") as shown in subsequent step S13.

In the case of the operation to display thumbnails, the image processing and control section 5 displays thumbnails in subsequent step S14. The image processing and control section 5 determines in subsequent step S15 whether or not a selecting operation by means of a touch, a crisscross key or the like on the touch panel 8 has been performed in the state where thumbnails are displayed.

If no selecting operation has been performed, the image processing and control section 5 returns to processing in step S12. If a selecting operation has been performed, the image processing and control section 5 enlarges and displays the selected thumbnail as shown in step S16. After processing in step S16, the image processing and control section 5 returns to processing in step S12.

If in step S13 the display operation is not the operation to display thumbnails, the image processing and control section 5 performs control for displaying a next image as shown in step S17 and thereafter returns to processing in step S12.

If the image processing and control section 5 determines in step S12 that no display button operation has been performed, it determines, through the motion detection section 13, as shown in step S18, whether or not a particular motional operation, e.g., an oscillating operation has been performed on the camera 1 by the user.

Figure 8:
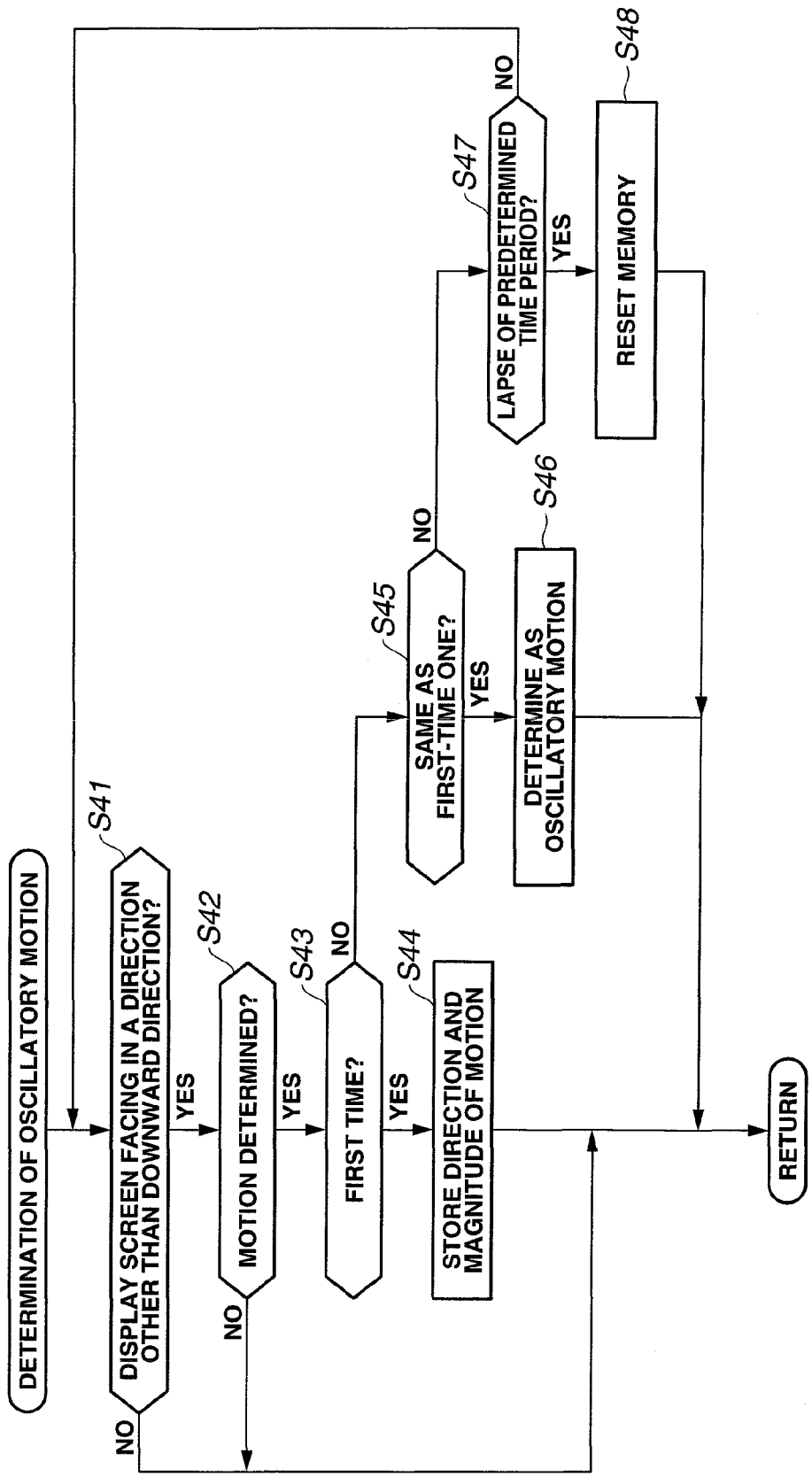
FIG. 8 is a flowchart showing an example of a detailed processing procedure for processing as to the occurrence of an oscillatory motion shown in FIG. 5.

In processing for determination in step S18 as to whether or not an oscillating operation has been performed, which will be described below with reference to FIG. 8, determination as to whether or not a motion has been produced at least a number of times exceeding at least one is made for determination as to whether or not an oscillatory motion has been produced.

If the image processing and control section 5 determines that no oscillatory motion has been produced (cases where it is determined that no oscillatory motion has been produced includes a case where a motion is caused but not recognized as oscillatory), it proceeds to processing in step S20.

If the image processing and control section 5 conversely determines that an oscillatory motion has been produced, it performs, as shown in step S19, processing for oscillating sorting display corresponding to the oscillating operation by referring to the image sorting information and thereafter proceeds to processing in step S20. Processing for oscillating sorting display in step S19 will be described with reference to FIG. 9.

In step S20, the image processing and control section 5 determines whether or not the motion or the oscillatory motion has ended. If the motion or the oscillatory motion has not ended, the image processing and control section 5 returns to step S15. If no selecting operation has been performed, the image processing and control section 5 returns to processing in step S12.

If in step S20 the image processing and control section 5 determines through the motion detection section 13 that the oscillating operation has ended, it returns to processing in step S1.

As described, when an oscillating operation is detected in step S18, the image processing and control section 5 performs, in response to the oscillating operation, processing for oscillating sorting display, such that images to be displayed on the display section 6 are sorted by referring to the image sorting information recorded in the recording section 12 and each of groups of images similar to each other are collectively displayed by being collected together at a corresponding predetermined position.

Thus, the user can sort and display the shot images to be displayed on the display section 6 by performing the operation of simply oscillating the camera 1 without performing any complicated operation, and can easily make an image search or the like.

Processing for image sorting in step S8, performed by the image processing and control section 5 (the image sorting section 5*a* in the image processing and control section 5) will be described with reference to FIG. 6. FIG. 7A shows an example of sorting performed by this sorting processing. Image sorting information is recorded in the image sorting information recording area 12*a* of the recording section 12 by being associated with recorded images.

FIG. 7B shows in its left-hand section a diagram showing division of shot images and recognition of a face image and in its right-hand section a diagram showing sorting with respect to sizes D1 to D3.

When image sorting processing is performed, the image processing and control section 5 uses the distance to a subject by using a signal in a focusing section or the like at the time of shooting, uses color information on images, and uses face detection results from the face detection section 14, as described below.

In this image sorting processing, the image sorting section 5*a* determines the image, for example, as a snap (an image containing a full-length human figure and a background occupying a substantially large area), a portrait (showing mainly an expression on a face), a flower, a gadget, a pet or a landscape according to information including information on whether or not any face exists in an image, the size of a face, the number of faces and features of a face.

Scenes assumed to be frequently shot are roughly sorted in the present embodiment. However, sorting is not performed exclusively in the described way.

Figure 6:
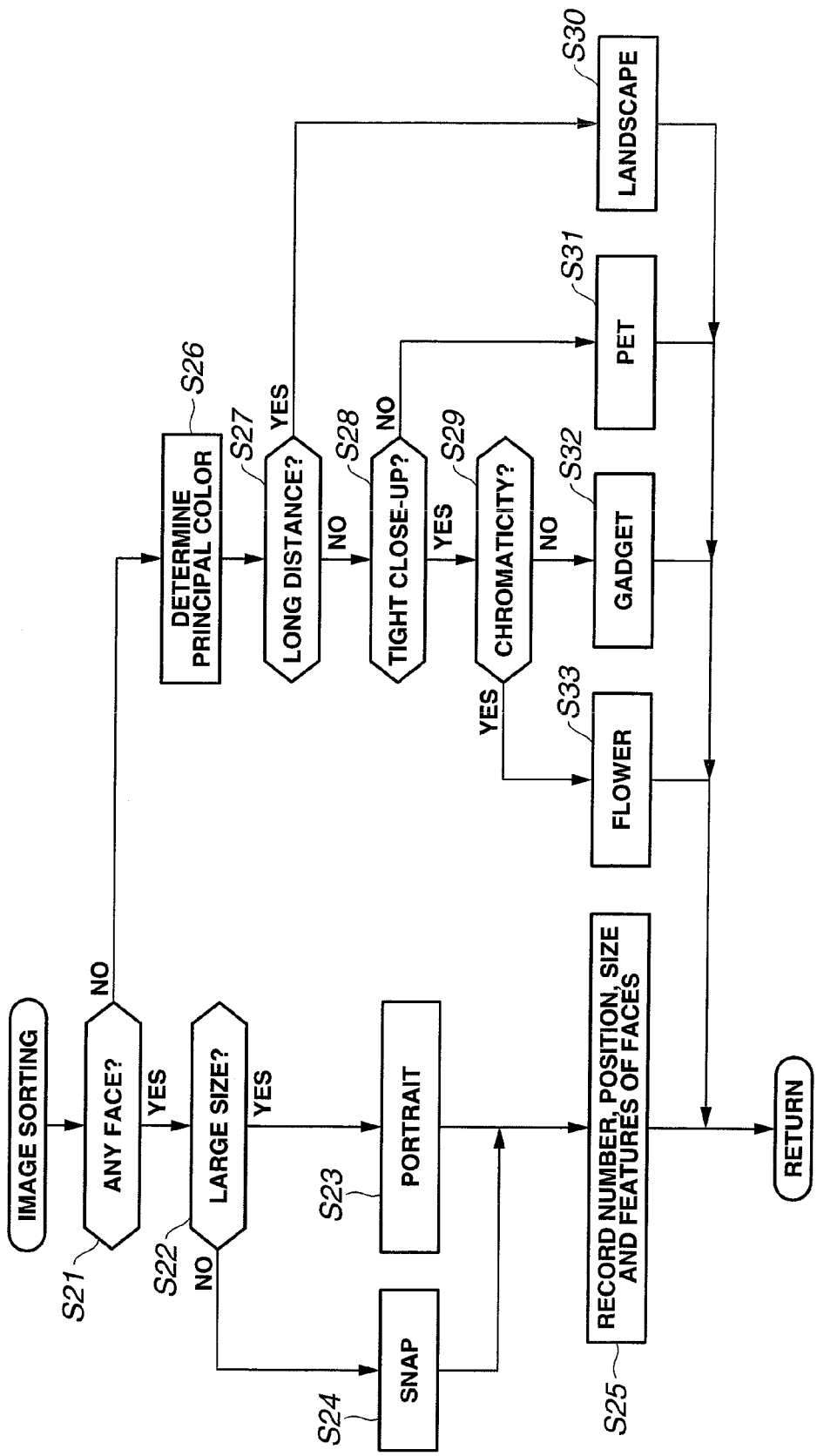
FIG. 6 is a flowchart showing an example of a processing procedure for image sorting shown in FIG. 5.
Figures 7A, 7B:
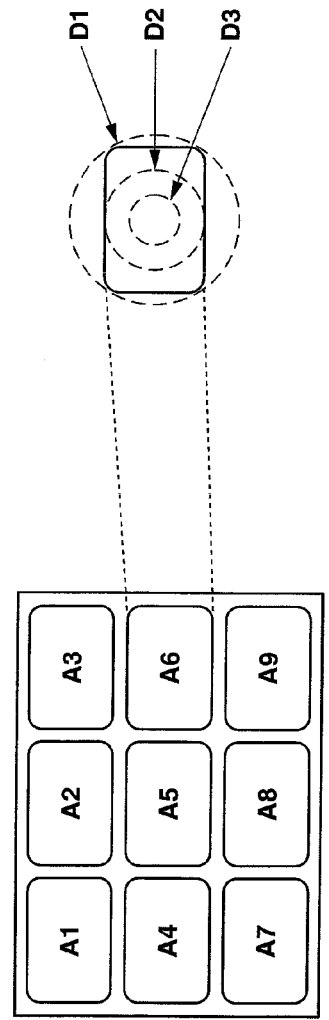
FIG. 7A is a diagram showing an example of image sorting shown in FIG. 6.
FIG. 7B is a diagram for explaining sorting with respect to the positions and sizes of faces by dividing an image at the time of image sorting shown in FIG. 7A.

When processing in FIG. 6 is started, the image processing and control section 5 determines, in first step S21, through the face and others detection section 14, whether or not any face exists in a shot image, thereby roughly determining whether or not the image is a human figure image.

If the image processing and control section 5 determines that a face exists, it determines in subsequent step S22 whether or not the size of the face is large. If the image processing and control section 5 determines that the size is large, it determines the image as a portrait in subsequent step S23. If the image processing and control section 5 determines that the size is not large, it determines the image as a snap as shown in step S24 and proceeds to subsequent step S25.

In step S25, the image processing and control section 5 records, for example, the number of faces and the position, size and features of each image in the image sorting information recording area 12*a* in the recording section 12.

If the image processing and control section 5 determines that no face exists in step S21, it determines in step S26 principal colors in the frame, e.g., a color of a central portion in the frame.

In subsequent step S27, the image processing and control section 5 determines whether or not the image is a long-distance image mainly from distance information on focusing. If the image processing and control section 5 determines that the image is a long-distance image, it sorts the image as a landscape as shown in step S30.

If the image processing and control section 5 determines in step S27 that the image is not a long-distance image, it determines in step S28 whether or not the image is a tight close-up image. If the image processing and control section 5 determines that the image is not a tight close-up image, it sorts the image as a pet in step S31.

If the image processing and control section 5 determines in step S28 that the image is a tight close-up, it determines in step S29 whether or not the image has a substantial chromaticity. If the image processing and control section 5 determines that the image has no substantial chromaticity, it determines the image as a gadget as shown in step S32.

If the image processing and control section 5 determines in step S29 that the image has a substantial chromaticity, it sorts the image as a flower as shown in step S33. After processing in step S25 and steps S30 to S33, the image processing and control section 5 proceeds to processing in step S9 shown in FIG. 5 to record the image sorting information as a sorting result by associating the information with the shot image.

Thus, each shot image is not only associated with only time and place information but also categorized as shown in the flowchart of FIG. 6, thereby improving the efficiency with which the image is searched for and displayed.

For example, when the user searches for a pet image, he or she can fast find the image if he or she searches images sorted into pet images as described above.

Results of sorting of images obtained in the above-described way are shown in graphic form in FIG. 7A by way of example. Referring to FIG. 7A, the numbers of faces, principal colors, the positions, features and sizes of the faces are sorted with respect to images 1 to 5, and these sorting results are recorded as image sorting information together with the date/time and place information.

In this case, the frame is divided, for example, into nine as shown in FIG. 7B, face images in the divided positions (A1 to A9) are sorted with respect to sizes D1 to D3 as shown in the right-hand section of FIG. 7B and are recorded together with face patterns (predetermined patterns P-A and P-B, an indeterminable pattern P-X).

For example, images of members of a family may be registered as predetermined patterns and images may be sorted by being compared with the registered patterns.

Images corresponding to the registered patterns are sorted as P-A, P-B, and images not corresponding to the registered images are sorted as P-X. One of the features of the present embodiment is that features in terms of color and pattern of portions below faces (regarded as dresses) are also recorded for respective images.

For example, the image 1 in FIG. 7A is determined as a snap. The number of faces in this image is two and a principal color is sorted as a green. The two faces are detected at positions A4 and A6 in FIG. 7B.

Also, the two faces at the positions A4 and A6 are registered one and not registered one as patterns. The sizes of the faces are respectively sorted as D2 and D3.

If the recording section 12 contains image sorting information as a result of such image sorting recorded as image-associated information associated with images, the user can speedily and efficiently make an image search.

If only simple sorting such as that described above is performed, the efficiency with which a search for a face image is made can be improved, because images sorted in steps S30 to S33 can be removed from objects to be searched. Thus, image sorting information such as that in the table shown in FIG. 7A is recorded in the image sorting information recording area 12*a* shown in FIG. 1.

Also, in the playback mode in the present embodiment, in which shot images are displayed on the display screen of the display section 6, images to be displayed on the display section 6 are sorted and displayed by using image sorting information, when the user performs an oscillating operation as an operation (command operation) to perform sorting and display by using a motion.

Processing for determination of an oscillatory motion (operation) in step S18 in FIG. 5 will be described with reference to FIG. 8. When this oscillatory motion determination processing is started, the image processing and control section 5 determines, as shown in step S41, whether or not the direction of the display screen of the display section 6 of the camera 1 (i.e., the direction of the display screen when the user views the display screen) is other than a downward direction based on the detection result from the three acceleration sensors 18*a* to 18*c* constituting the motion detection section 13.

Figure 5:
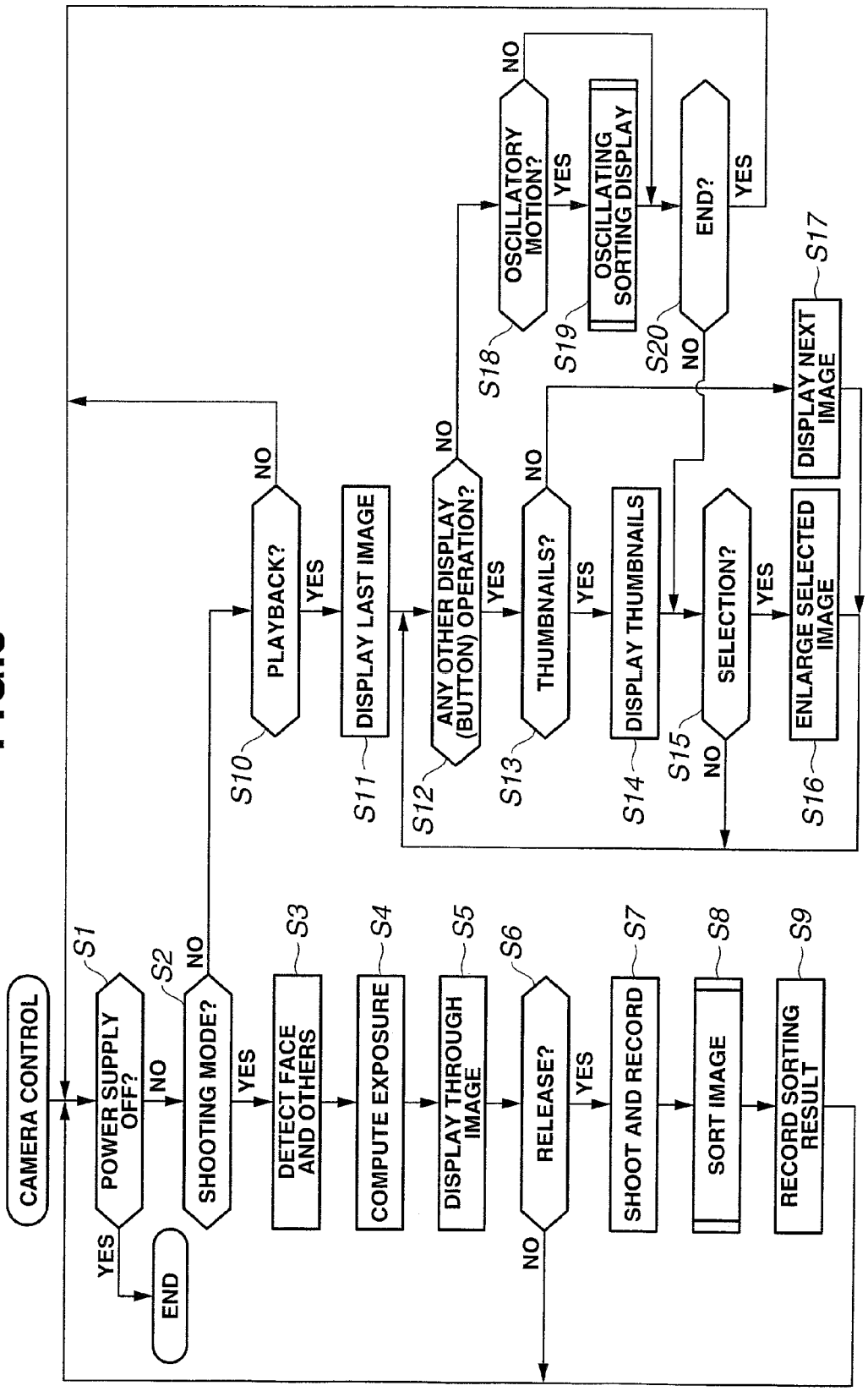
FIG. 5 is a flowchart showing an example of a control procedure for camera control in the first embodiment.

If the image processing and control section 5 determines that the direction of the display screen of the camera 1 is the downward direction, it ends this processing and proceeds to step S20 in FIG. 5. When the display screen is (facing) downward, it is difficult to observe the display screen in an ordinary state of use. Therefore this state is excluded from the conditions for determination of an oscillatory motion (selection between execution and nonexecution of the operation for this processing may be enabled as described below).

Conversely, if the image processing and control section 5 determines that the direction of the display screen of the camera 1 is other than the downward direction, that is, the direction meets the condition for determination of an oscillatory motion, it determines in subsequent step S42 whether or not any motion has been produced, by using the motion detection section 13.

In a modified example of determination as to whether or not any motion has been produced when the direction of the display screen of the camera 1 is other than the downward direction, the image processing and control section 5 may determine whether or not a motion has been produced (for detection of whether or not an oscillatory motion has been applied to the camera 1) in a state where the direction of at least one face of the camera 1 is not changed.

This method enables determination with improved reliability as to whether or not the user is performing an oscillating operation by viewing the display screen, and exclusion of user's inadvertent execution of an oscillating operation. For adaptation to a wide variety of user's uses, user's making a selection and setting as to execution/nonexecution of processing in step S41, for example, may also be enabled. For example, a user who sometimes appreciates images while lying on his or her back may turn off the function of processing in step S41.

If the image processing and control section 5 determines in step S42 that no motion has been produced, it ends this processing and proceeds to step S20 in FIG. 5. Conversely, if the image processing and control section 5 determines that a motion has been produced, it determines in step S43 whether or not the motion has been produced first time.

If the image processing and control section 5 determines that the motion has been produced first time, it stores in step S44 the direction and magnitude of the motion in a memory or the like in the image processing and control section 5. After step S44, the image processing and control section 5 proceeds to step S20 in FIG. 5.

If the image processing and control section 5 determines in step S43 that the motion is not the one produced first time, it determines in step S45 whether or not the motion is the same as the one produced first time. If the image processing and control section 5 determines that the motion is the same as the one produced first time, it determines in step S46 that an oscillatory motion has been produced.

As described above, when the image processing and control section 5 detects a motion by using the motion detection section 13, it stores information on the first motion (one produced first time), for example, in a memory (step S42). The image processing and control section 5 detects (determines) a motion when detecting through the motion detection section 13 an amount of motion exceeding a threshold value set in advance.

If the image processing and control section 5 detects a motion after the one produced first time, it determines whether or not the motion is substantially the same as the one produced first time and stored in the memory (step S45). If the image processing and control section 5 determines that the next motion is the same as the one produced first time, it determines that an oscillating operation has been performed (step S46).

Figure 10A:
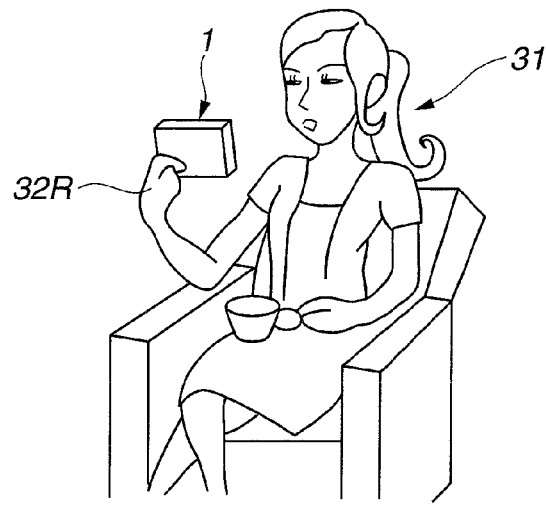
FIG. 10A is a diagram showing a state where a user is appreciating a shot image by holding the camera with the right hand.

In the case of an action to move the camera 1 in a stirring manner while viewing the screen, as shown in FIG. 10A, such above-described motion can be determined from application of comparatively large accelerations repeatedly applied (as a repeated motion) in the order of left top→right top→right bottom→left bottom→left top→ . . . , while accelerations along the optical direction of the camera 1 are small. If display control with this stirring operation is performed so as to display images as if images are gathered in a peripheral portion of the screen of the camera 1 by centrifugal force, an intuitively understandable expression can be achieved. Needless to say, control in this way is not exclusively performed. A movement of the camera 1 similar to sinking and floating of the bow of a boat on the waves may be determined from a process in which the sensor (18c in FIG. 4D) that detects the acceleration in the direction along the optical axis in a lower portion of the camera 1 repeats producing periodic acceleration outputs in the order of front→rear→front→ . . . (At this time, no accelerations in the leftward and rightward directions are outputted.) Such a movement can also be utilized for gathering of images in a peripheral portion (top/bottom) of the screen. Other movements such as a sliding movement in the left-right direction and a sliding movement in the top-bottom direction may also be utilized. Also in the case of utilizing such movements, recognition as to whether the user is consciously moving the camera 1 can be performed by checking the regularity of acceleration in the particular directions and whether there is no acceleration in any other direction.

When a motion is produced only one time, the motion is not determined as an oscillatory motion. Also, if a next motion is largely different from the one produced first time, the motions are not determined as an oscillatory motion. One motional unit for detection of a motion can be changed and set as desired.

For example, a motion is detected as one produced first time when a signal having the waveform shown in FIG. 4B or 4C is detected. Even in a case where, when a motion produced next time is detected, the amplitude of the motion produced next time differs by about several ten percent from that of the motion produced first time, the motion produced next time is determined as the same as the motion produced first time if the waveform corresponding to the motion produced next time is similar to that corresponding to the motion produced first time.

The occurrence of an oscillatory motion may be determined if a portion generally corresponding to the first half of the waveform shown in FIG. 4B or 4C caused by the motion produced next time is generally the same as the first half of the waveform caused by the motion produced first time.

After determining the occurrence of an oscillatory motion in step 46, the image processing and control section 5 proceeds to processing in step S19 in FIG. 5 to perform processing for oscillating sorting display as processing for sorting display of shot images corresponding to the oscillating operation.

As shown in FIG. 5, in the case of determining the occurrence of an oscillatory motion in step S18, the image processing and control section 5 performs processing for oscillating sorting display in subsequent step S19 and thereafter returns again to step S1. Accordingly, if the same oscillating operation is repeated, the image processing and control section 5 repeats processing for oscillating sorting display in correspondence with the repetition of the oscillating operation.

Therefore, if the user performs oscillating operation at a high speed, the image processing and control section 5 performs processing for oscillating sorting display in step S19 at a high speed. Conversely, if the user performs oscillating operation at a low speed, the image processing and control section 5 performs processing for oscillating sorting display in step S19 at a low speed.

The speed of processing for oscillating sorting display may be changed according to the motion intensity (oscillatory motion intensity), as described below with reference to FIG. 11.

If the image processing and control section 5 determines in step S45 that the motion is not the same as the one produced first time, it determines in step S47 whether or not a predetermined time period has elapsed.

In this process, the image processing and control section 5 refers to the clock information in the clock section 15 when it detects a motion through the motion detection section 13.

By determining whether or not the predetermined time period set in advance has elapsed after the detection (determination) of the motion produced first time, the image processing and control section 5 determines whether or not the user has performed the same motional operation subsequently as that which has been performed first time, or another motional operation considered different with respect to time.

If the predetermined time period has not elapsed, the image processing and control section 5 returns from this processing to processing in step S41 to continue making oscillatory motion determination. If the predetermined time period has elapsed, the image processing and control section 5 resets, as shown in step S48, the information on the motion produced first time and stored in the memory in step S44, and proceeds to processing in step S20 in FIG. 5.

Processing for oscillating sorting display in step S19 in FIG. 5 performed in the case where the occurrence of an oscillatory motion is determined in step S46 in FIG. 8 will be described with reference to FIG. 9.

If the image processing and control section 5 determines the occurrence of an oscillatory motion, it determines, in first step S51 as shown in FIG. 9, whether or not a next image exists.

If the image processing and control section 5 determines the occurrence of an oscillatory motion, and if it further determines that an image exists in the next position in the display order of images displayed on the display screen of the display section 6, it proceeds to subsequent step S52. If there is no next image, the image processing and control section 5 skips to step S55.

In subsequent step S52, the image processing and control section 5 reduces the size of the image on display. In subsequent step S53, the image processing and control section 5 determines whether or not a similar image exists.

If the image processing and control section 5 determines that a similar image exists, it superimposes the reduced image on the similar image in subsequent step 54 and proceeds to subsequent step S55.

If the image processing and control section 5 determines in step S53 that no similar image exists, it determines in step S56 whether or not there is a vacant peripheral portion in the display screen.

If the image processing and control section 5 determines that there is a vacant peripheral portion, it moves the reduced image into the vacant peripheral portion in step S57.

If the image processing and control section 5 determines in step S56 that there is no vacant peripheral portion, it puts the image in a similar image group in step S58.

A position (area) to which a reduced image is moved to be displayed may be set in the recording section 12 according to image sorting information on sorts of images categorized in advance. In such a case, the position to which a reduced image is moved to be displayed is determined as a predetermined position according to the image sorting information.

After processing in steps S54, S57, and S58, the image processing and control section 5 proceeds to processing in step S55. In step S55, the image processing and control section 5 determines whether the user is touching the camera 1 at a left or right position on the camera 1.

That is, the image processing and control section 5 determines whether the user is touching the camera 1 through the touch panel 8, for example, in the vicinity of a right end or a left end of the camera 1.

In step S59 subsequent to step S55, the image processing and control section 5 determines through the motion detection section 13 whether or not sharp acceleration has been performed in the direction opposite from the touch position. More specifically, the image processing and control section 5 determines whether or not the user has performed on the camera 1 an operation in motion form, e.g., a tapping (striking) operation which can be detected by being discriminated from an oscillatory motion.

For determination in this case, if the threshold value in determining whether or not an oscillatory motion has been produced is a first threshold value, a second threshold value for detecting a motion of an amplitude larger than the first threshold value is used. When a motion exceeding the second threshold value is detected, it is determined that sharp acceleration has been performed. This step S59 is operation determination for orderly arranging display utilizing a motion.

In step S58 before this step 59, the image processing and control section 5 determines the touch position on the camera 1 at which the user is touching the camera 1 through the touch panel 8. Virtually, however, the image processing and control section 5 detects a hold position at which the user is holding the camera 1.

That is, in step S59, while the user is holding the camera 1, the image processing and control section 5 determines through the motion detection section 13 whether or not sharp acceleration has been performed in the direction opposite from the position on the camera 1 at which the camera 1 is held. To improve the reliability of determination in step S59 as to whether sharp acceleration has been performed in the held state, determination in step S55 of the touch position or as to whether the camera is touched may be again made after determination as to whether sharp acceleration has been performed. When the touch position or the touched state is again determined, the held state is determined.

For example, in a state where the user is holding a right end portion of the camera 1, the image processing and control section 5 determines through the motion detection section 13 whether or not sharp acceleration has been performed in a leftward direction.

If the image processing and control section 5 determines that sharp acceleration has been performed, it orderly arranges (displays) latest images in an n-by-n matrix (n: an integer equal to or larger than 2) in subsequent step S60 and thereafter proceeds to step S20 in FIG. 5.

If the image processing and control section 5 determines in step S59 that any sharp acceleration in the direction opposite from the touch position (held position) has not been performed, it proceeds to processing in step S20 in FIG. 5 without performing processing in step S60.

FIGS. 10A to 10F show diagrams for explaining the process shown by the flowchart of FIG. 9. FIG. 10A shows a state in which a user 31 is appreciating shot images by holding the camera 1 with right hand 32R.

Figure 10B:
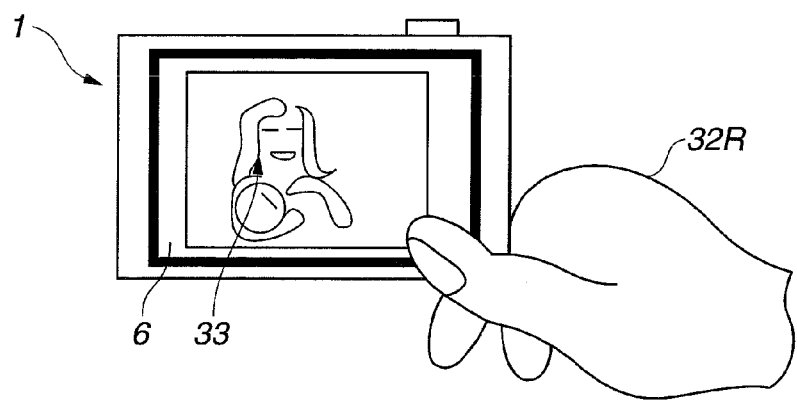
FIG. 10B is a diagram showing an image displayed on the display screen of a display section in the case shown in FIG. 10A.

FIG. 10B shows an example of one image 33 in the display screen of the display section 6 of the camera 1. When in the state shown in FIG. 10B user 31 performs an oscillatory operation to produce an oscillatory motion of the camera 1, the image processing and control section 5 determines the oscillatory operation through the motion detection section 13.

If it is determined that the oscillatory operation has been performed, determination is made in step S51 as to whether or not a next image exists, as described above.

With respect to the image shown in FIG. 10B, a next image 34 is assumed to exist. Accordingly, the size of the preceding image 33 is reduced by processing in step S52. In this case, the next image 34 is shown in a large size generally at the center, as shown in FIG. 10C.

With respect to processing in subsequent step S53, a case where no similar image exists is assumed. Accordingly, processing in step S56 is performed. In this case, the image 33 is moved into or placed in a vacant peripheral portion in the display screen (a portion at the left top corner in FIG. 10C).

Figure 10C:
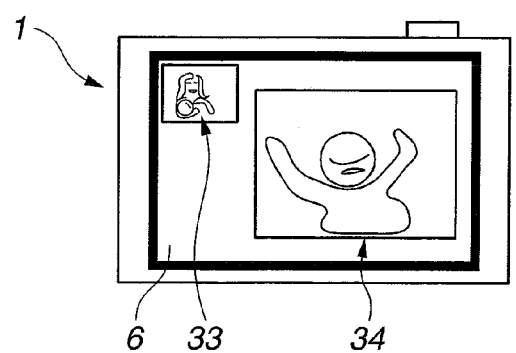
FIG. 10C is a diagram showing images displayed on the display screen of the display section when an oscillatory operation is performed in the state shown in FIG. 10B.
Figure 10D:
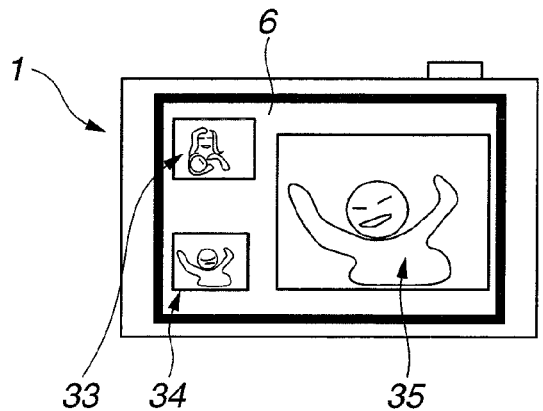
FIG. 10D is a diagram showing images displayed on the display screen of the display section when an oscillatory operation is performed in the state shown in FIG. 10C.

Further, when it is determined that an oscillating operation has been performed, the image 34 in FIG. 10C is moved into (placed in), for example, a left bottom corner portion in the display screen while being reduced in size, as shown in FIG. 10D, and a next image 35 is displayed in large size generally at the center.

Figure 10E:
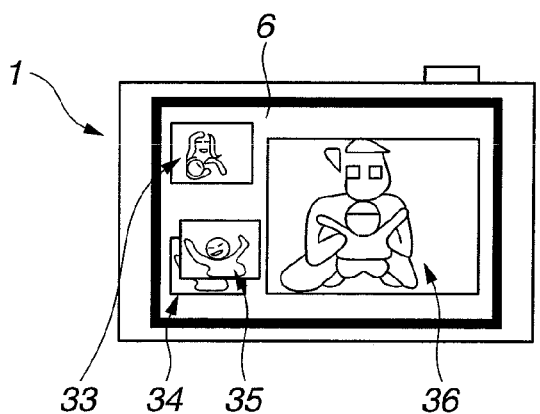
FIG. 10E is a diagram showing images displayed on the display screen of the display section when an oscillatory operation is performed in the state shown in FIG. 10D.

With respect to the image 35 in FIG. 10D, a case where it is determined in processing in step S35 that a similar image exists is assumed. In this case, when it is determined that another oscillating operation has been performed, the image 35 reduced in size is superimposed on the similar image 34, as shown in FIG. 10E. Also, a next image 36 is displayed in a large size generally at the center of the display screen.

Referring to FIG. 10E, when user 31 is holding (touching) the camera with right hand 32R in the vicinity of the right end of the touch panel 8 as shown in FIG. 10B, the image processing and control section 5 determines the touch position in the vicinity of the right end through the touch panel 8.

When user 31 produces, for example, a sharp motion of the camera 1 (or taps or strikes the camera) in a holding state, the image processing and control section 5 detects the corresponding sharp acceleration through the motion detection section 13.

Figure 10F:
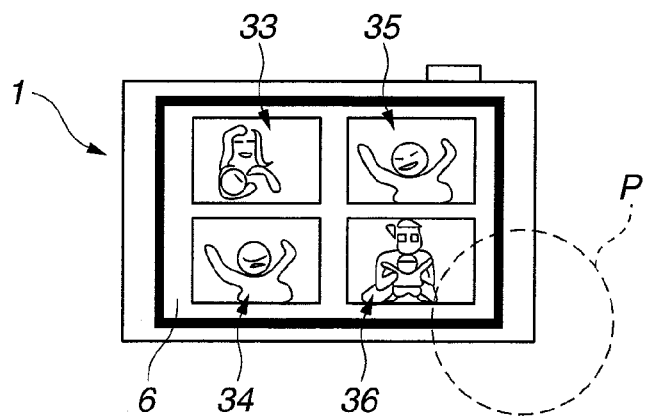
FIG. 10F is a diagram showing images displayed by being orderly arranged on the display screen of the display section when a tapping operation is performed in the state shown in FIG. 10E.

In this case, the latest four images 33 to 36 in display form in FIG. 10E are displayed in a reduced size as shown in FIG. 10F by the display control section 5b in the image processing and control section 5 while being orderly arranged in an n-by-n matrix (2×2 in this case) by through of the motion detection section 13. Thus, a plurality of images can also be displayed in an orderly arranged state by utilizing a motional operation different from an oscillatory motion. It is, therefore, possible for the user to easily check images displayed in peripheral portions while being sorted.

In FIG. 10F, the right touch position (hold position) P determined in step S55 is indicated. For a left-handed user, the touch panel 8 also detects a touch position in the vicinity of a left corner.

In the camera 1 in the present embodiment operating as described above, as user 31 performs the operation of applying a motion to the camera 1 only a number of times exceeding one while holding the camera 1, the image processing and control section 5 successively displays shot images in a large size on the display screen of the display section 6 and displays previously displayed images by successively moving the images to vacant peripheral portions in the display screen while sorting the images so that the images similar to each other are gathered together on a group-by-group basis.

Thus, user 31 performs only the simple oscillatory operation to successively display shot images and to successively sort and display the images in a size-reduced state in the peripheral portions, so that user 31 can easily check the images that he or she wants to display.

The method of displaying size-reduced images in the peripheral portions enables a multiplicity of images to be sorted when shot and to be simultaneously displayed at a plurality of different positions.

With the camera 1 according to the present embodiment, an environment can be provided in which an image which user 31 wants to appreciate can be easily searched for and displayed by a simple operation, thereby greatly improving the operability for user 31.

Figure 11:
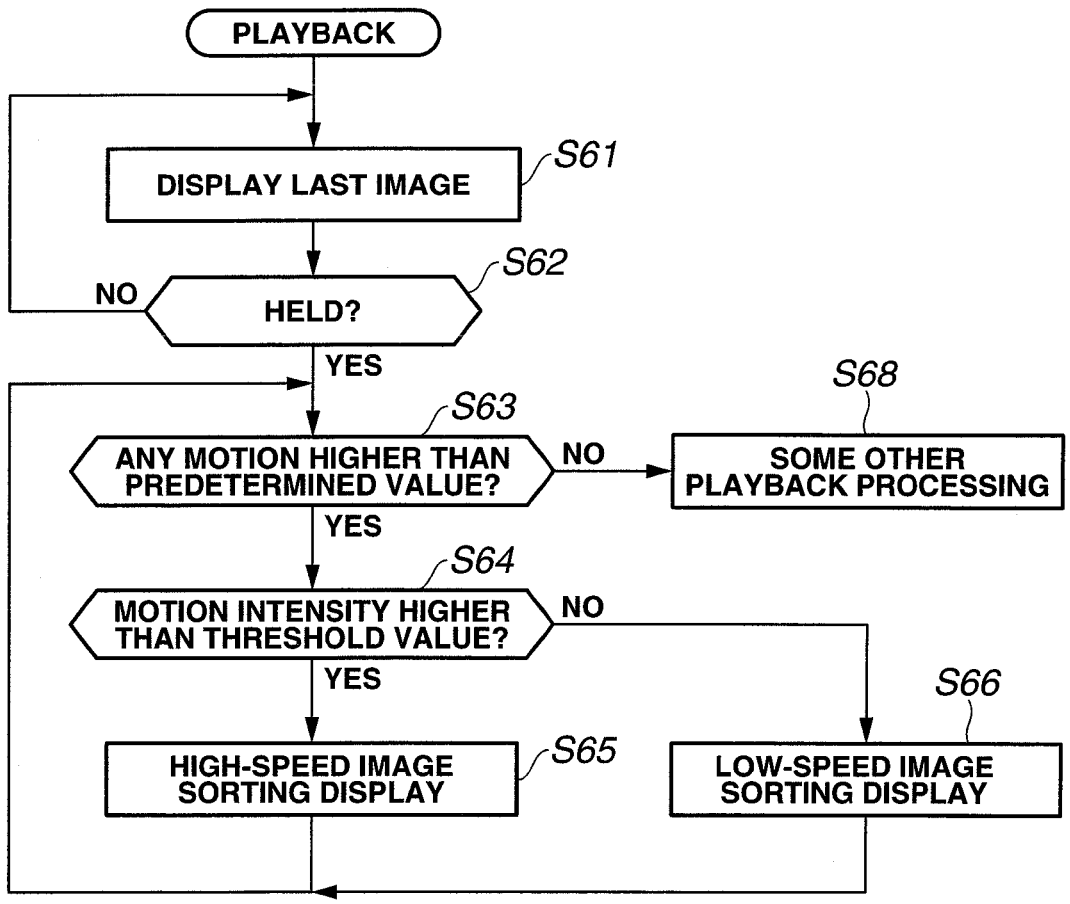
FIG. 11 is a flowchart showing an example of a processing procedure for performing image sorting display by applying a motion of a value equal to or higher than a predetermined value in a playback mode in a modified example of the first embodiment.

As a process in the camera 1 in a modified example of the above-described first embodiment, a control process for displaying by using image sorting information may be performed by a motional operation, as shown in FIG. 11.

The camera 1 in the modified example has, as its basic components, the components shown in FIG. 1: the recording section 12 for recording images shot by the image pickup section 3, the display section 6, the motion detection section 13 that detects a motion applied to the camera 1 in a state where holding of the camera 1 is detected through the touch panel 8, and the display control section 5b in the image processing and control section 5 that sorts and displays images when application of a particular motion set in advance, such as a motion defined by a value equal to or higher than a predetermined value, is detected by the motion detection section 13.

When the playback process in the playback mode is started, the image processing and control section 5 displays the final one of shot images on the display screen of the display section 6 in first step S61 in FIG. 11. As an example of a display in this case, the example shown in FIG. 10B may be referred to.

In subsequent step S62, the image processing and control section 5 determines whether or not user 31 is holding the camera 1 through the touch panel 8. In this case, the image processing and control section 5 determines whether or not user 31 is holding the camera 1 from determination as to whether or not right hand 32R or the like of user 31 is touching a portion in which a portion of the touch panel 8 is provided as shown in FIG. 10B.

If the image processing and control section 5 determines that camera 1 is not held, it returns to processing in step S61. (The image processing and control section 5 may alternatively proceed to some other playback processing in step S68.)

If the image processing and control section 5 determines that camera 1 is held, it determines, for example, whether or not a motion of a value equal to or higher than a predetermined value has been produced through the motion detection section 13 for detection of application of a particular motion.

If the image processing and control section 5 determines that any motion of a value equal to or higher than the predetermined value has not been produced, it performs some other playback processing in step S68.

For determination of a motion of a value equal to or higher than the predetermined value, the method of determining the occurrence of an oscillatory motion when the number of motions exceeds at least one in the above-described first embodiment may be used. A setting may alternatively be made such that the occurrence of a motion of a value equal to or higher than the predetermined value is determined when the amplitude of a motion exceeds the predetermined value set in advance. For example, if the amplitude of a motion is large even in a case where the motion has been produced only one time, image sorting display corresponding to oscillating sorting display may be started and executed.

The arrangement may alternatively be such that if the direction of the motion of the camera 1 or the case 2 of the camera 1 produced corresponds to a particular direction of motion, image sorting display corresponding to oscillating sorting display is started and executed.

Some other playback processing in step S68 mentioned above is, for example, processing for thumbnail display in step S14 according to the determination of the occurrence of an operation to perform thumbnail display in step S13 or processing for displaying an image selected by a selecting operation in step S15 while enlarging the image as shown in step S16.

If the image processing and control section 5 determines that a motion of a value equal to or higher than the predetermined value has been produced, it determines whether or not the intensity of the motion is larger than a threshold value set in advance for determination, for example, in a plurality of stages (two stages in the present embodiment) of the intensity of the motion detected by the motion detection section 13.

If the intensity of the motion exceeds the threshold value, the image processing and control section 5 performs processing for high-speed image sorting display in step S65. As processing for image sorting display, processing for placing shot images at a plurality of positions in the display screen of the display section 6 according sorting corresponding to the image sorting information associated with the images, or like processing, which is the same as or similar to that for oscillating sorting display in FIG. 9 described above, is performed. If in step S64 the intensity of the motion does not exceed the threshold value, the image processing and control section 5 performs processing for low-speed image sorting display in step S66.

After processing in step S65 and step S66, the image processing and control section 5 returns to processing in step S63.

The image processing and control section 5 performs the above-described control process. Therefore, user 31 can only perform the operation of producing a motion to the camera 1, for example, with an amplitude equal to or higher than a predetermined value while holding the camera 1 to successively display shot images on the display screen of the display section 6 and can simultaneously display, as groups of similar images, previously displayed images by reducing in size and successively moving the images to (placing the images in) vacant peripheral portions in the display screen.

In this case, high-speed image sorting display is performed if the intensity of the motion is high, and low-speed image sorting display is performed if the intensity of the motion is low. Thus, user 31 can produce an image sorting display at a speed according his/her preference by changing the intensity of the motion.

Thus, user 31 performs only the operation to apply a simple motion while holding the camera 1, and images displayed on the display section 6 are thereby successively updated and displayed. User 31 can therefore check those images and also check previous images as size-reduced images.

Thus, an environment in which images which user 31 wants to appreciate can be easily searched for and displayed can be provided and the operability for user 31 can be greatly improved.

(Second Embodiment)

A second embodiment of the present invention will be described with reference to FIG. 12. The camera 1 in the second embodiment has the same configuration as that shown in FIG. 1 but only a portion of the control program stored in the ROM 16 is changed. More specifically, the control process for displaying images while sorting the images in the playback mode differs from that in the first embodiment.

The process in the playback mode in the present embodiment will be described with reference to FIG. 12. FIGS. 13A to 13D show diagrams for explaining the process.

Figure 13A:
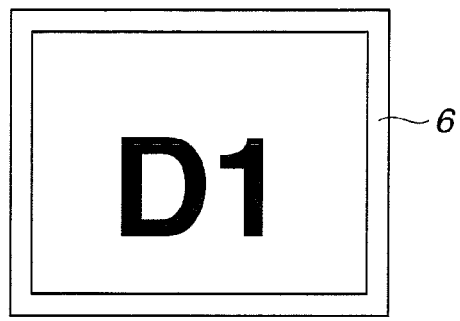
FIG. 13A is a diagram showing a state in which a last shot image is displayed on the display screen of the display section in the playback mode.

When setting in the playback mode is made in first step S71, the image processing and control section 5 displays a last shot image on the display screen of the display section 6. FIG. 13A shows the display screen in this case. In FIG. 13A, an example of a display in which an image Dl is displayed is illustrated. The operating method may be displayed on the display screen of the display section 6 before step S71.

In subsequent step S72, the image processing and control section 5 determines through the motion detection section 13 whether or not an oscillatory motion (or a shake) has been produced.

Oscillatory motion determination in this case may be made through determination as to whether or not a second motion has been detected in a predetermined time period from the time at which the first motion is detected in the first embodiment. Determination as to whether or not a motion of a value equal to or higher than a predetermined value as in the modified example may alternatively be made. The same also applies with respect to other embodiments described below.

If the image processing and control section 5 determines that an oscillatory motion has been produced, it produces in subsequent step S73 a thumbnail display of the image and other subsequent images on the display screen of the display section 6 by reducing the size of the images.

More specifically, image D1 in FIG. 13A is reduced in size and displayed in thumbnail form together with a subsequent image by one oscillatory motion; three images are displayed in thumbnail form by the second oscillatory motion; and four images are displayed in thumbnail form by the third oscillatory motion.

Figure 13B:
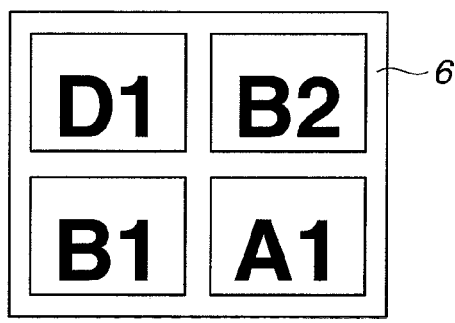
FIG. 13B is a diagram showing an example of a thumbnail display of four images produced by detecting an oscillatory motion three times from the state shown in FIG. 13A.

FIG. 13B shows an example of a display in this case. Referring to FIG. 13B, four images D1, B1, B2, and A1 are displayed. In subsequent step S74, the image processing and control section 5 determines whether or not the number of images has exceeded 4 by addition of the next image.

If the number of images is not larger than 4, the number of images in thumbnail display is increased by the steps in the return route from step S74 to step S72 via steps S78 and S80 in correspondence with the number of times the oscillatory operation is performed, as described above.

Figure 13C:
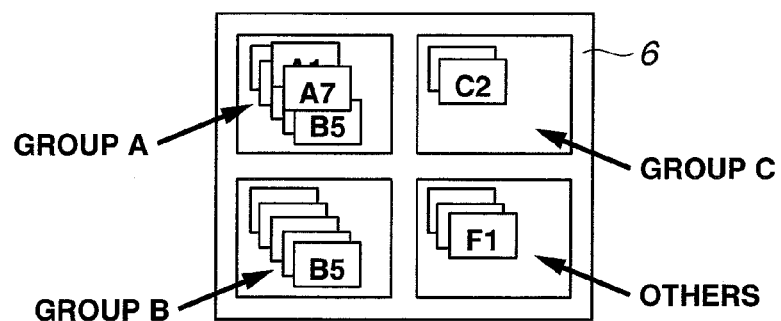
FIG. 13C is a diagram showing an example of a display produced by sorting groups of similar images in four corner areas when the number of images is equal to or larger than 4.

If the image processing and control section 5 determines in step S74 that the number of images is larger than 4, it sorts similar ones of the images and displays groups of similar images by arranging the groups of the images at the four corners (in areas at the four corners) of the display screen in subsequent step S75. FIG. 13C shows an example of a display in this case.

As shown in FIG. 13C, images are sorted by being divided into four: images in group A, images in group B, images in group C and other images (other groups) and are respectively displayed at the four corners of the display screen.

If the image processing and control section 5 determines that no oscillatory motion has been produced, it determines in step S76 through the motion detection section 13 whether or not a tapping (striking) operation has been performed by user 31.

If the image processing and control section 5 determines that tapping has been performed, it orderly arranges (transposes) and displays the same number of images in step S77 and thereafter proceeds to step S78. If the image processing and control section 5 determines in step S74 that the number of images is not larger than 4, it proceeds to processing in step S78, as in the case of determining no tap in step S76.

In step S78, the image processing and control section 5 determines whether or not user 31 has selected one of the images by a touch operation. If one of the images has been selected by a touch operation, the image processing and control section 5 displays the selected image while enlarging the image in step S79.

Figure 13D:
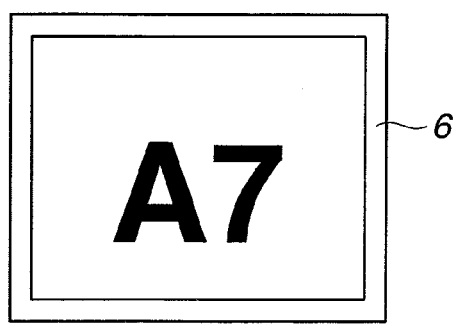
FIG. 13D is a diagram showing an example of a display in which an image selected by a touch in the state shown in FIG. 13C is displayed by being enlarged.

With respect to this case, FIG. 13D shows an example of a display in a case where user 31 selects image A7 in group A in FIG. 13C by touching. Image A7 in group A is selected and displayed while being enlarged. After this enlargement display, the image processing and control section 5 returns to processing in step S72.

If the image processing and control section 5 determines in step S78 that no selecting operation by touching has been performed, it determines in step S80 whether or not an ending operation has been performed by producing an oscillatory motion. If the ending operation has been performed, the image processing and control section 5 ends processing in FIG. 12. If the ending operation has not been performed, the image processing and control section 5 returns to processing in step S72.

Figure 14:
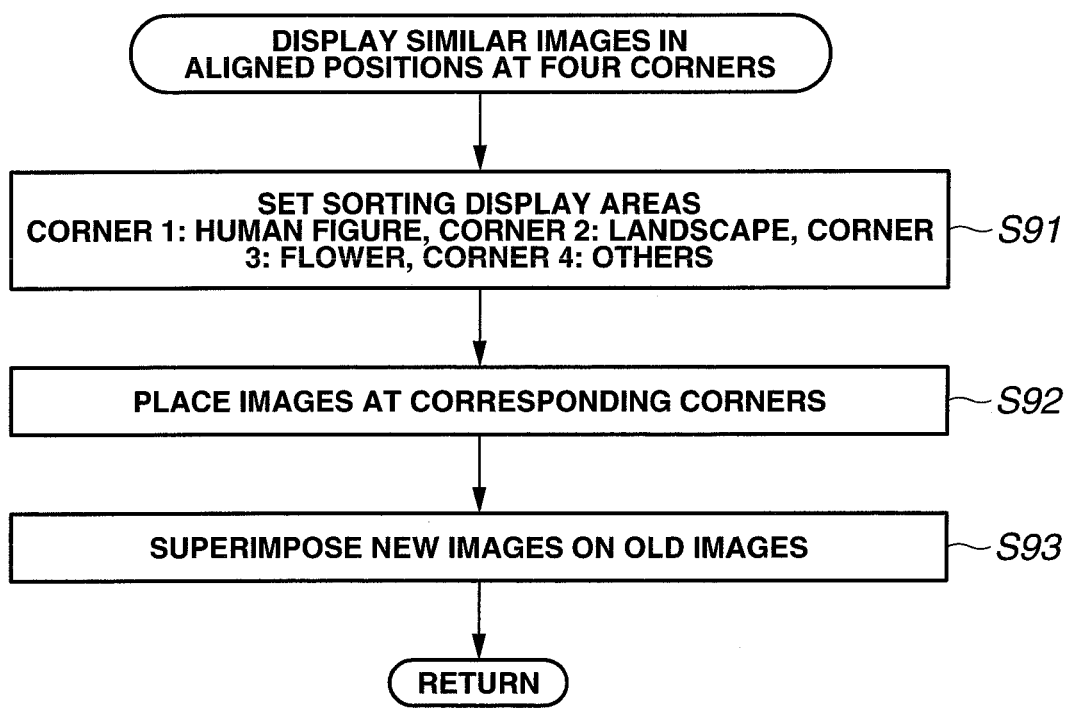
FIG. 14 is a flowchart showing a processing procedure for displaying images by arranging similar images in FIG. 12.

FIG. 14 shows details of processing in step S75 for displaying similar images by sorting the images and arranging the images at the four corners (in areas at the four corners) of the display screen.

When this processing is started, the image processing and control section 5 sets, in first step S91, sorting display areas for displaying images by sorting the images into four groups: human figures at the left top corner (corner 1) in the four corners, landscapes at the left bottom corner (corner 2), flowers (or macro-images) at the top right corner (corner 3) and others at the bottom right corner (corner 4).

In subsequent step S92, the image processing and control section 5 sorts (determines) each shot image as one corresponding to one of the four groups (in the case where an oscillatory motion has been produced) and places the image at the corresponding corner (moves the images to the corresponding corner).

In subsequent step S93, when the next image is placed at the same corner as one of those at which images have been placed in step S92, the image processing and control section 5 superimposes the new image on one, if any, of the older ones already placed. Thus, the images are displayed by being placed at the corners so that the newest image is at the uppermost position.

The newness of one image in this case does not denote that the image is new in the order with respect to time of the dates and times of shooting of images but denotes that the image is new at the time of actual display on the display screen. After processing in step S93, processing shown in FIG. 14 ends.

In the present embodiment operating as described above, shot images are successively displayed by a simple operation of applying a motion of at least a value equal to or higher than a predetermined value to the camera 1 as in the first embodiment and, if a predetermined number of images (4 in the present embodiment) is exceeded, the images can be displayed by being sorted.

Thus, user 31 can easily search for an image according to his/her demand. The present embodiment is capable of improving the operability for user 31.

(Third Embodiment)

A third embodiment of the present invention will be described with reference to FIG. 15. The third embodiment corresponds to a modified example of the second embodiment. The camera 1 in the present embodiment has the same configuration as that shown in FIG. 1 but only a portion of the control program stored in the ROM 16 is changed.

More specifically, the control process for displaying images while sorting the images in the playback mode differs from that in the first embodiment. In the present embodiment, a control process modified from that in the second embodiment is performed. FIG. 15 shows the control process in the playback mode in the present embodiment.

Figure 12:
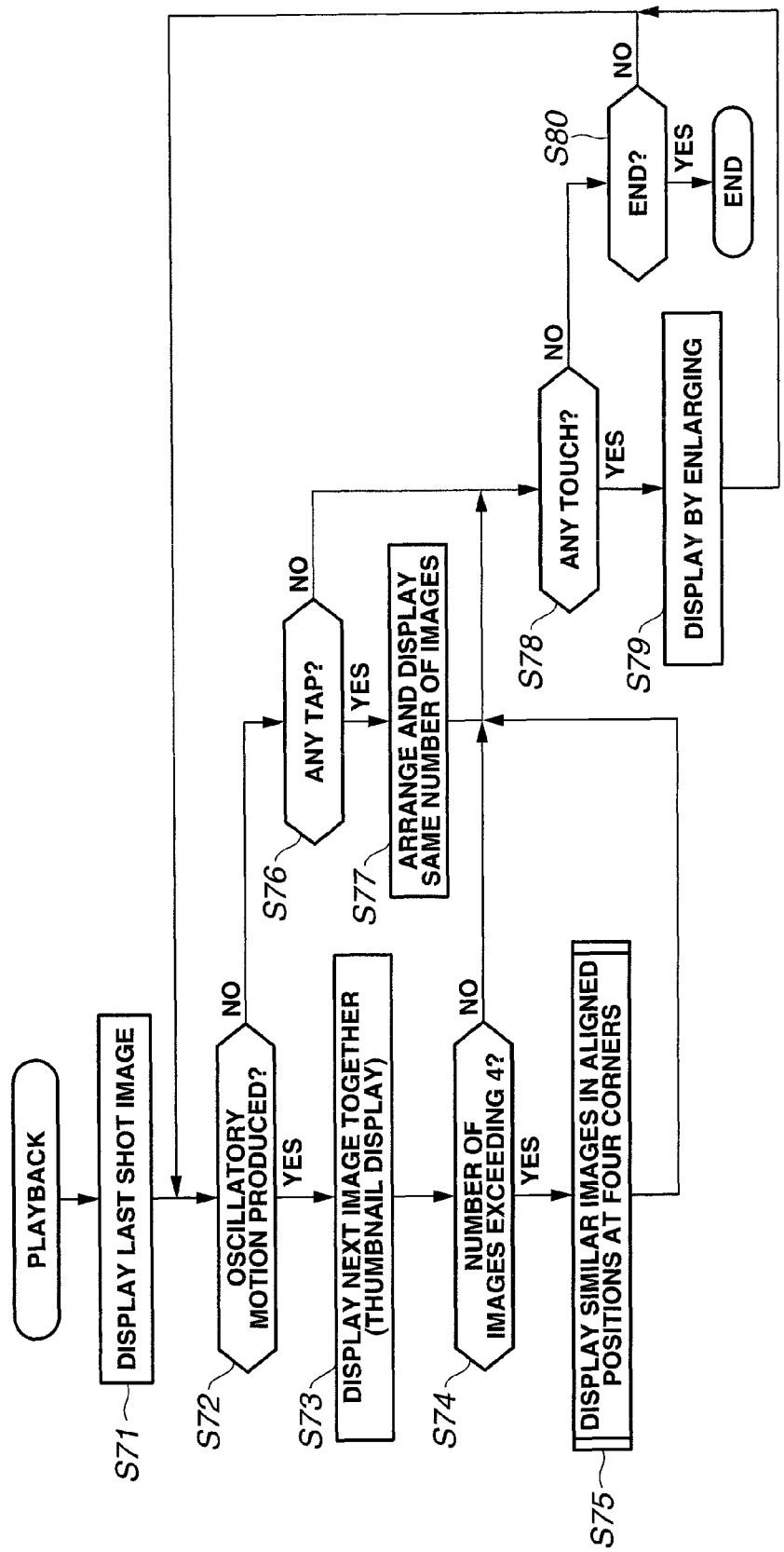
FIG. 12 is a flowchart showing an example of a processing procedure for performing image sorting display by utilizing a motion in a playback mode in a second embodiment of the present invention.
Figure 15:
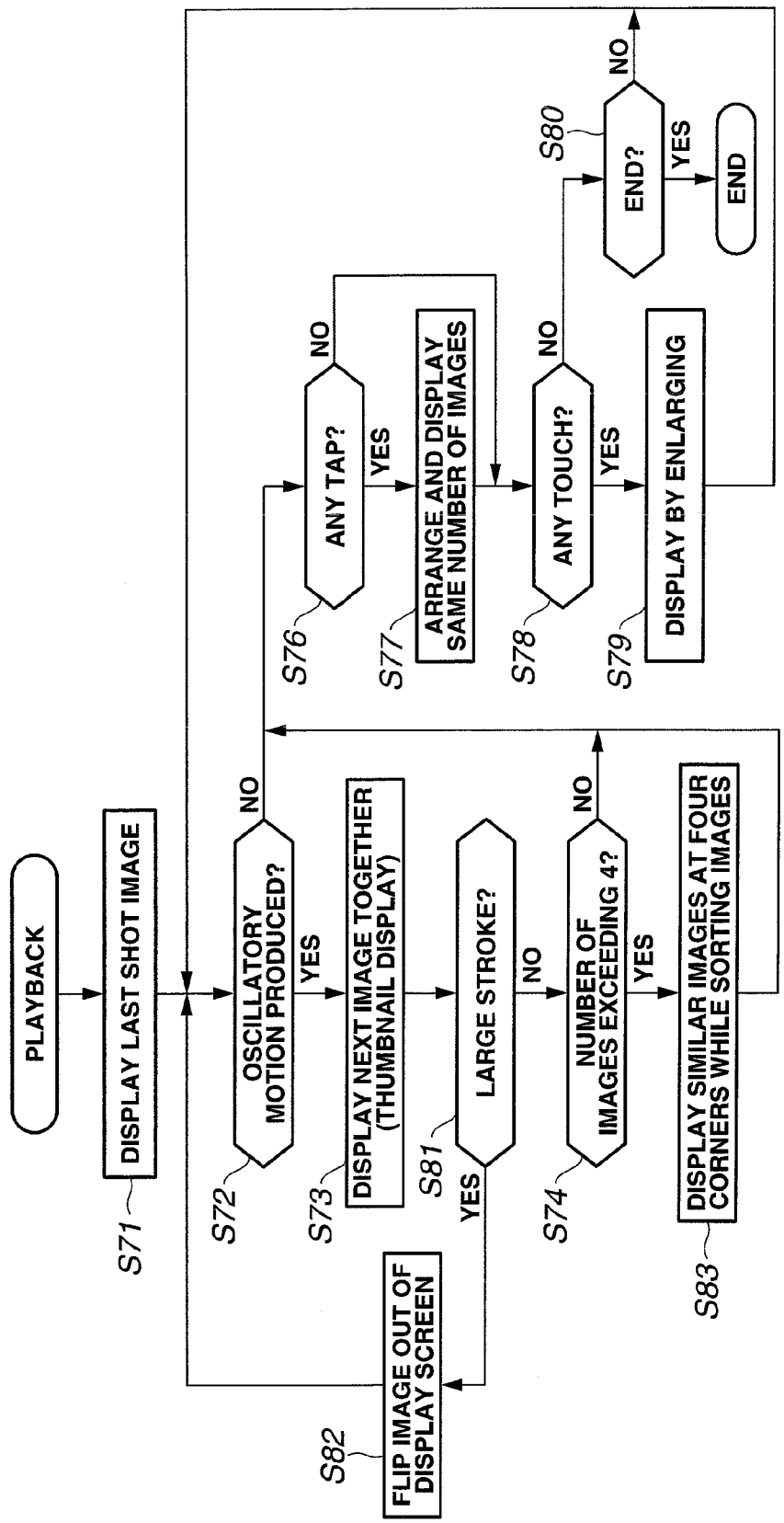
FIG. 15 is a flowchart showing an example of processing procedure for performing image sorting display by utilizing a motion in a playback mode in a third embodiment of the present invention.

Referring to the flowchart shown in FIG. 15, processing in step S83 is performed in place of processing in step S75 in the flowchart of FIG. 12. Also, processing for determination as to whether or not the magnitude (of an oscillatory motion) is high is provided in step S81 between steps S73 and S74 in FIG. 12.

That is, in step S81 following thumbnail display in step S73, the image processing and control section 5 determines through the motion detection section 13 whether not the stroke through which the camera 1 is moved (by the oscillatory operation in step S72) is large. If the image processing and control section 5 determines that the stroke of movement by the operation is not large, it proceeds to step S74.

Determination as to the magnitude of the stroke of movement by the operation may be made through determination as to the magnitude of change in acceleration along a straight line (in other words, whether the amplitude of the motion is large). This determination method is not exclusively used. A motion produced by moving along a circular-arc line (swinging) such as to produce centrifugal force may be determined as an oscillatory motion and the stroke of movement by the operation may be determined.

If the image processing and control section 5 determines that stroke of movement by the operation is large, it performs in step S82 processing for flipping the image out of the display screen and thereafter returns to processing in step S72.

In the case of determining in step S74 that the number of images is not larger than 4 or after processing in step S83, the image processing and control section 5 proceeds to processing in step S76.

Thumbnail display when the number of images is not larger than 4 in step S73 is the same as that in the second embodiment. For example, a display when the number of images is 2 or 4 is as shown in FIG. 13A or FIG. 13B.

Figure 16A:
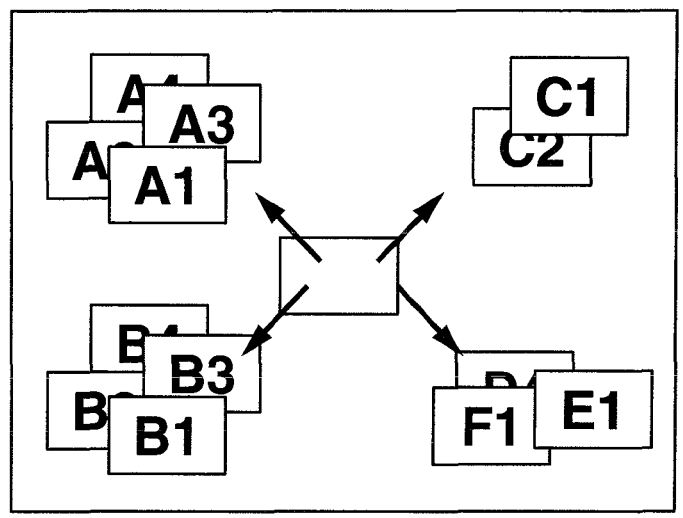
FIG. 16A is a diagram showing a state where similar images are displayed by being sorted when the occurrence of an oscillatory motion is determined in a case where the number of images is larger than 4.

In the present embodiment, if it is determined in step S74 that the number of displayed images is larger than 4, each image displayed in a central portion is sorted and placed (moved) to be delivered to the corresponding one of corner groups in corner areas at the four corners, as shown in FIG. 16A.

That is, while, when the number of images is 4, a thumbnail display in which size-reduced images are orderly arranged as shown in FIG. 13B is produced as described above in the description of the second embodiment, a display produced when the number of images becomes 5 is such that the fifth image is displayed at the center and the preceding images are sorted and displayed by being delivered to peripheral portions at the four corners. The image in the central portion may be displayed in a size larger than that of the images displayed by being placed in the peripheral portions as in the first embodiment, or may be displayed in the same size as the images in the peripheral portions.

If a further oscillatory motion is produced, the sixth image is displayed at the center and the fifth image is delivered to the corresponding one of the corner groups at the four corners according to the sorting result.

If user 31 performs a tapping (striking) operation in step S76 after this processing in step S83, the image processing and control section 5 determines the occurrence of a tap.

Figure 16B:
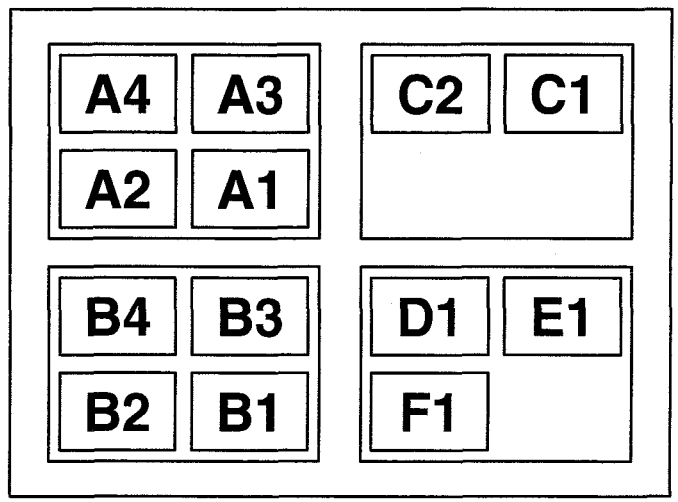
FIG. 16B is a diagram showing an example of a display in which a number of similar images exceeding 4 are displayed by being orderly arranged by a tapping operation.

If the image before this determination of the occurrence of a tap is in the state shown in FIG. 16A, the image processing and control section 5 orderly arranges and displays the same number of images in response to the determination of the occurrence of a tap, as shown in FIG. 16B.

In this case, the image processing and control section 5 performs display control to display the images sorted into the groups by orderly arranging the images in each group. When user 31 performs this tapping operation, all the images sorted into the groups are displayed by being orderly arranged and, therefore, user 31 can easily check the images.

Other processings are the same as those in the second embodiment. The present embodiment has substantially the same advantages as those of the second embodiment.

(Fourth Embodiment)

Figure 17:
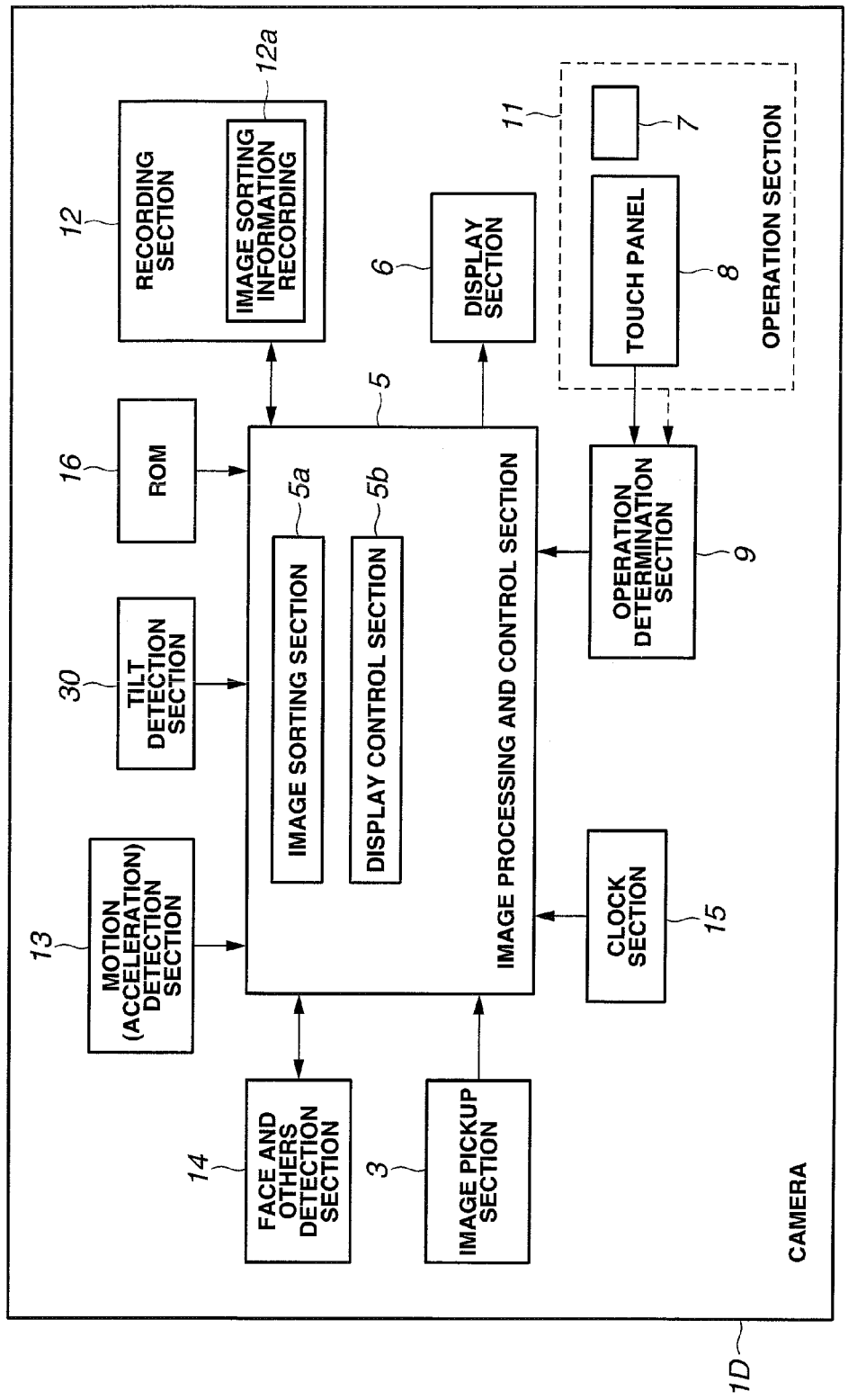
FIG. 17 is a block diagram showing the internal configuration of a camera in a fourth embodiment of the present invention.

A fourth embodiment of the present invention will be described with reference to FIG. 17. A camera 1D in the third embodiment has a tilt detection section 30 for tilt detection in addition to the components of the camera 1 shown in FIG. 1. The tilt detection section 30 detects a tilt of the camera 1D held by user 31 and outputs the detection result to the image processing and control section 5.

The image processing and control section 5 performs control to change, according to the tilt angle of the camera 1D detected by the tilt detection section 30, the display speed at which images are sorted and displayed when an oscillatory motion is applied. The tilt angle detected by the tilt detection section 30 is an angle of a tilt of the display section 6 (a plane containing the display screen surface of the display section 6) from a reference plane.

In a default setting, the reference plane is set, for example, in correspondence with a state where the display screen of the display section 6 is parallel to a horizontal plane.

In this case, the tilt detection section 30 detects the amount of tilt of the display screen of the display section 6 from the state of being parallel to the horizontal plane. User 31 can change the setting of the reference plane through a menu view. The tilt detection section 30 may be formed by utilizing the three acceleration sensors 18a to 18c constituting the motion detection section 13

In other respects, the present embodiment has only one difference from the third embodiment in that a portion of the control program stored in the ROM 16 is changed.

Figure 18:
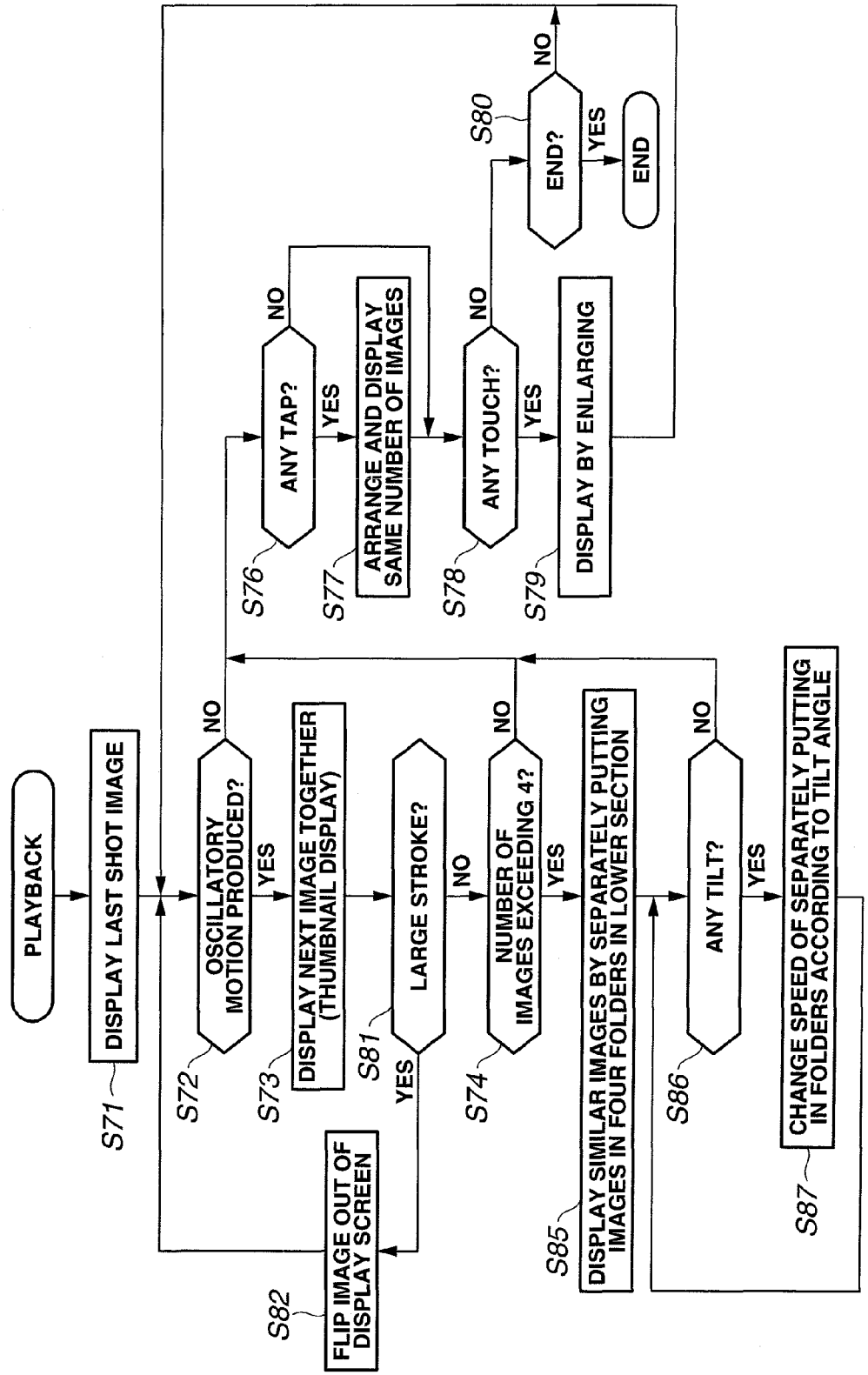
FIG. 18 is a flowchart showing an example of a processing procedure for performing image sorting display by utilizing a motion in a playback mode in the fourth embodiment of the present invention.

FIG. 18 shows the control process in the playback mode in the present embodiment. In the flowchart of FIG. 18, step S83 following step S74 in the flowchart of FIG. 15 is replaced with steps S85, S86, and S87.

When the process in the playback mode is started, a last shot image is displayed in first step S71, as in the process shown in FIG. 15. If it is determined in step S72 that an oscillatory motion has been produced, and if it is determined in step S81 that the stroke of movement is not large, the process proceeds to step S74.

If the image processing and control section 5 determines in step S74 that the number of images is not larger than 4, it performs the same processing as in FIG. 15. If the image processing and control section 5 determines that the number of images is larger than 4, it proceeds to processing in step S85.

Figure 19A:
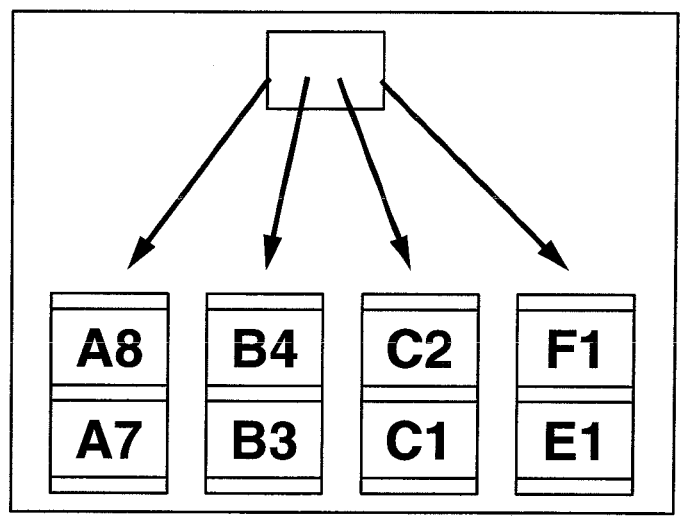
FIG. 19A is a diagram showing a state where similar images are displayed by being sorted when the occurrence of an oscillatory motion is determined in a case where the number of images is larger than 4.

In step S85, when sorting and displaying images which have been displayed in an upper section of the display screen, the image processing and control section 5 displays the images by separately putting the images in four folders in a lower section of the display screen provided as four sorting display areas in which similar images are to be gathered according to sorting. FIG. 19A shows an example of a display in this case. An image before sorting is displayed in the upper section of the display screen. The image is placed in the corresponding one of four folders in the lower section according to sorting.

Thus, if the number of images is larger than 4, the images are displayed by delivering each image to the corresponding one of a plurality of folders (four folders in this case) placed in the left-right direction in the lower section of the display screen from a center of the upper section of the display screen.

The four folders in the left-right direction correspond to the above-described group A, group B, group C, and others (group of others).

In step S86 after processing in step S85, the image processing and control section 5 determines whether or not there is a tilt by using the tilt detection section 30. If the image processing and control section 5 determines in this step S86 that there is no tilt, it proceeds to processing in step S76. If the image processing and control section 5 determines that there is a tilt, it proceeds to processing in step S87.

In step S87, in the case of moving images from the upper section to the lower section to sort and deliver the images as shown in FIG. 19A, the image processing and control section 5 changes the delivery speed according to the value of the tilt angle in the case where there is a tilt.

More specifically, the delivery speed is reduced when the tilt angle is small, and the delivery speed is increased when the tilt angle is large. After processing in step S87, the image processing and control section 5 returns to processing in step S86.

If user 31 intends to search for and display one of a plurality of shot images according to his/her demand, he or she produces an oscillatory motion of the camera 1D (shakes the camera 1D) while holding the camera 1D to sort and deliver the image at the center of the upper section of the display screen to the lower section.

In this case, the delivery speed can be increased by increasing the tilt angle of the camera 1D from the reference plane. Conversely, the speed of delivery for sorting display can be reduced by reducing the tilt angle. The display state is fixed when the tilt angle is set parallel to the reference plane.

Figure 19B:
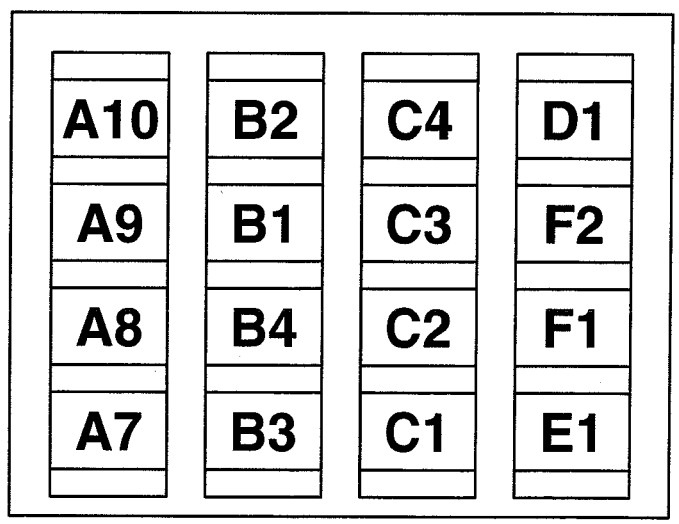
FIG. 19B is a diagram showing an example of a display in which a number of similar images exceeding 4 are displayed by being orderly arranged by a tapping operation.

In other respects, the process is the same as that in the third embodiment. However, if it is determined, for example, in step S76 that a tap has been applied, and if 16 images are sorted and displayed immediately before this determination, the images are displayed by being orderly arranged, for example, as shown in FIG. 19B. In this case, images similar to each other are orderly arranged in the vertical direction in each folder.

The present embodiment has substantially the same advantages as those of the second embodiment. Also, the present embodiment is capable of changing the speed of sorting and displaying images according to the above-described tilt angle and, therefore, user 31 can easily search for an image according to his/her demand by a simple operation.

(Fifth Embodiment)

A fifth embodiment of the present invention will be described with reference to FIG. 20. A camera 1 in the fifth embodiment has the same configuration as that shown in FIG. 1 but only a portion of the control program stored in the ROM 16 is changed.

More specifically, the control process for displaying images while sorting the images in the playback mode differs from that in the first embodiment. The control process in the present embodiment corresponds to a modification of that in the second or fourth embodiment.

Figure 20:
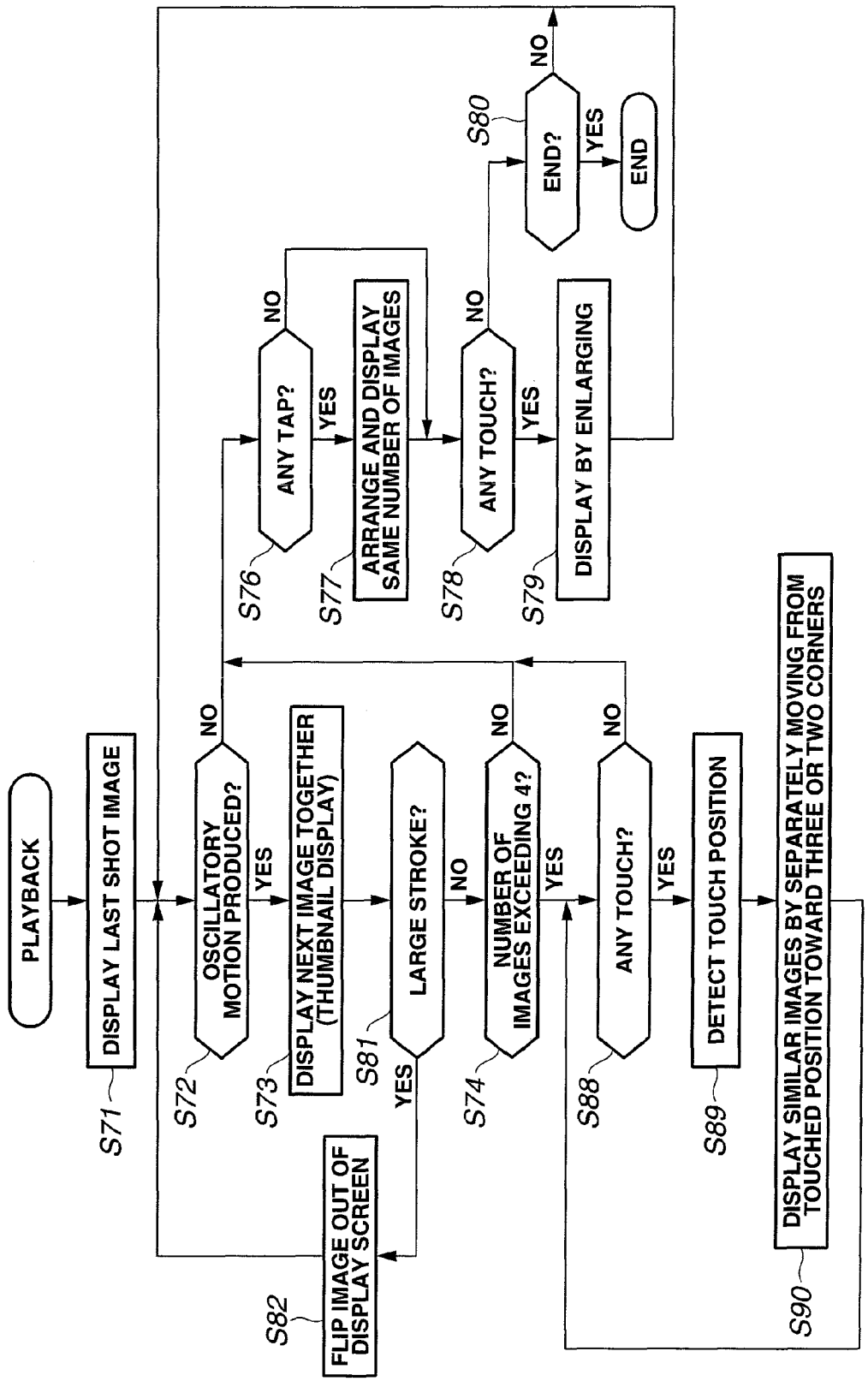
FIG. 20 is a flowchart showing an example of processing procedure for performing image sorting display utilizing a motion in a playback mode in a fifth embodiment of the present invention.

FIG. 20 shows the control process in the playback mode in the present embodiment. In the flowchart shown in FIG. 20, steps S85 to S87 following step S74 in the flowchart of FIG. 18 are replaced with steps S88 to S90.

In step S74, the image processing and control section 5 determines whether or not the number of images is larger than 4. The image processing and control section 5 proceeds to processing in step S76 in the case of determining that the number of images is not larger than 4, and proceeds to step S88 in the case of determining that the number of images is larger than 4.

In this step S88, the image processing and control section 5 determines through the touch panel 8 and the operation determination section 9 whether or not user 31 is touching the display screen. This touch comprises a hold.

The image processing and control section 5 proceeds to step S76 in the case of determining no touch, and, in the case of touch, detects in step S89 the touched position on the touch panel 8 (i.e., the display screen).

As detection of a touched position in the present embodiment, detection as to, for example, which one or two of the four corners in peripheral portions of the display screen correspond to the touched position is performed. If the display form for sorting and display is changed according to the touched position, the touched position may be displayed on the display screen of the display section 6.

In subsequent step S90, when sorting and displaying similar images, the image processing and control section 5 displays the images by delivering the images from the touched position to the two or three corners (areas in the vicinity of the three corners) on the untouched peripheral side, and returns to processing in step S88. In this case, images to be placed at the corner touched by user 31 according to sorting are not displayed on the display screen.

Figure 21A:
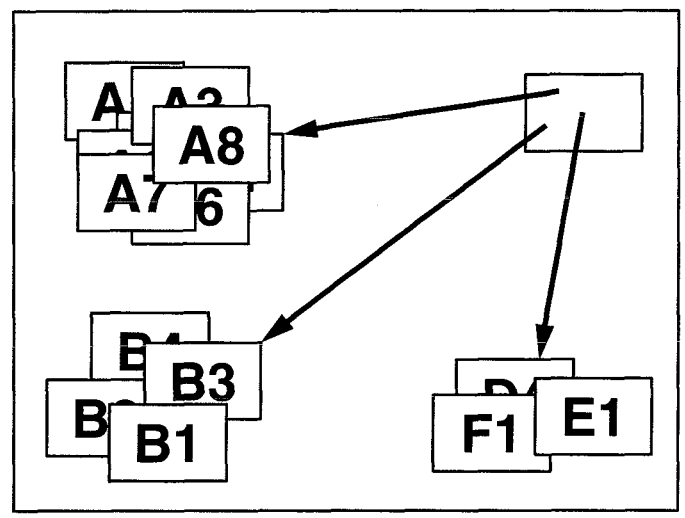
FIG. 21A is a diagram showing a state in which similar images are sorted and displayed when the occurrence of an oscillatory motion is determined in a case where the number of images is larger than 4.

FIG. 21A shows an example of a display in processing in step S90. FIG. 21A shows a state where user 31 is touching, for example, the top right corner of the display screen, and where images displayed at the top right corner are displayed by being moved toward the other three corners to be delivered to groups of similar images.

In the case of touching at two of the corners, the images are displayed by being delivered to the other two corners. The images in group C to be displayed at the top right corners by being sorted are not displayed in this case. After processing in this step S90, the process returns to step S88.

If such processing is performed, user 31 may touch a position corresponding to the corner at which images in the group excluded from the objects to be searched. By doing so, user 31 can sort and display images including the images to be searched at the other three or two corners.

That is, in the present embodiment, when images are sorted and displayed, part of groups of similar images to be sorted and displayed can be displayed by setting at least one of the groups in a non-display state to narrow down the groups according to a selection made by user 31 (by touching), instead of displaying all the groups.

Figure 21B:
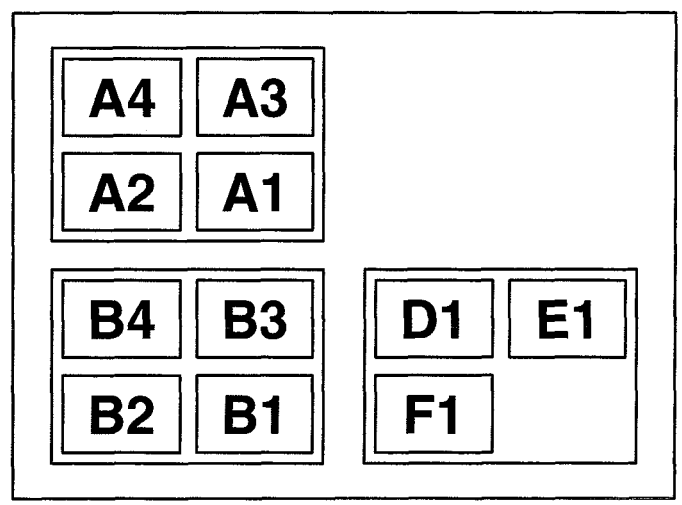
FIG. 21B is a diagram showing an example of a display in which a number of similar images exceeding 4 are displayed by being orderly arranged by a tapping operation.

After processing in step S90, the process returns to step S88. The process moves to step S76 when user 31 stops touching. When user 31 performs a tapping operation, the same number of images are displayed by being orderly arranged, as shown in FIG. 21B. Other processings are same as those in the fourth embodiment.

In the present embodiment, user 31 can sort and display only images included in the objects to be searched, by setting groups of images excluded from the objects to be searched in a non-display state. In other respects, the present embodiment has substantially the same advantages as those of the second embodiment.

Embodiments or the like configured, for example, by modifying the above-described embodiments or the like without changing the gist of the invention or by combining portions of two or more of the embodiments also belong to the present invention.

For example, the configuration forming the camera 1 shown in FIG. 1 is not limited to the one shown in FIG. 1. Any other configuration having the functions of the camera 1 as the whole of the camera 1 may suffice. For example, a configuration in which the image processing and control section 5 includes the motion detection section 13 may suffice. A configuration in which the display control section 5b has the functions of the image processing and control section 5 may also suffice.

An image display control method according to the present embodiment or the like may be formed by using the ROM 16 or any other recording medium on which the control program according to some of the above-described embodiments is recorded.

While the embodiments have been described with respect to the case of a camera 1 or the like as a shooting apparatus having shooting functions, the present invention can also be applied to an image playback apparatus such as a photo viewer or a photo frame not having the image pickup section 3 in the configuration shown in FIG. 1 for example. The present invention can also be applied even to this image playback apparatus if the playback apparatus is provided with recording means corresponding to the recording section 12 in FIG. 1 and capable of recording images shot by a separate shooting apparatus or the like.

What is claimed is:

1. An image playback apparatus having a recording section which records shot images, and a display section which displays the images, the apparatus comprising:
   a motion detection section which detects a motion applied to the image playback apparatus in a state where hold of the image playback apparatus is detected; and
   a display control section which, when application of a particular motion set in advance is detected by the motion detection section, sorts and displays the images displayed on the display section; and
   a determination section which, when the motion detection section detects a motion larger than a first threshold value in a first detection and in a second detection following the first detection, determines that an oscillatory motion has been produced, and when the motion detection section detects a motion larger than a second threshold value which is larger than the first threshold value, determines that sharp acceleration has occurred, wherein,
   when the determination section has detected the first motion larger than the first threshold value, information on the first motion is stored in a memory, and when the determination section determines that the second motion is substantially the same motion as the first motion stored in the memory, the determination section determines that the first motion and the second motion are the oscillatory motion,
   when application of the particular motion is detected, the display control section causes or does not cause, according to a determination result of whether or not the sharp acceleration has occurred in the particular motion, the images to be flipped out of a display screen of the display section, and changes a speed at which the images displayed on the display section are placed at predetermined positions in the display section according to a speed of an operation of the oscillatory motion when it is determined that an oscillatory motion has been produced.

2. The image playback apparatus according to claim 1, further comprising a sorting information recording section which records in advance sorting information utilized for the sorting when the display control section sorts and displays the images, by associating the sorting information with each image.

3. The image playback apparatus according to claim 1, wherein the display control section places the images displayed on the display section at a plurality of positions as the predetermined positions on the peripheral portion side of the display section according to the sorting of the images when application of a motion of an amplitude equal to or higher than a predetermined value set in advance, a motion applied a certain number of times equal to or larger than a predetermined number or a motion in a predetermined direction is detected as the particular motion by the motion detection section.

4. The image playback apparatus according to claim 1, wherein the display control section places each of the images displayed on the display section by reducing the size of the image when placing the image at the predetermined position in the display section according to the sorting of the images.

5. The image playback apparatus according to claim 4, wherein the display control section places the images at a plurality of the predetermined positions by gathering similar ones of the images into groups according to the sorting of the images when placing the images while reducing the size of the images.

6. The image playback apparatus according to claim 5, wherein, when application of a second motion different from application of the particular motion is detected, the display control section displays the images placed at the plurality of positions by orderly arranging the images on the display section.

7. The image playback apparatus according to claim 1, wherein
   when it is determined that sharp acceleration has occurred in the particular motion, the display control section causes the images displayed on the display section to be flipped out of the display screen of the display section.

8. The image playback apparatus according to claim 1, further comprising a tilt detection section which detects a tilt angle of the display section from a reference plane, wherein
the display control section changes, according to the tilt angle detected by the tilt angle detection section, the speed at which the images displayed on the display section are placed at the predetermined positions in the display section according to the sorting of the images.

9. The image playback apparatus according to claim 1, wherein the determination section does not determine that the oscillatory motion has been produced when the second motion largely differs from the first motion.

10. The image playback apparatus according to claim 1, wherein the memory stores, as the information of the first motion, information of direction and magnitude of the first motion.

11. The image playback apparatus according to claim 1, wherein the determination section does not determine that the oscillatory motion has been produced when at least one of a waveform or amplitude associated with the second motion differs from at least one of a waveform or amplitude associated the first motion by more than a predetermined amount.

12. The image playback apparatus according to claim 1, wherein the determination section determines that the second motion is substantially the same motion as the first motion stored in the memory based on a comparison of at least one of the respective waveforms associated with the first and second motions and the respective amplitudes associated with the first and second motions.

13. A method for controlling a display of an apparatus, the method comprising:
capturing, with the apparatus, a plurality of images;
sorting, by the apparatus, the plurality of images captured;
recording, on the apparatus, the plurality of images captured, in association with respective results of the sorting;
detecting a motion applied, by a user, to the apparatus;
determining, by the apparatus, whether or not the motion detected is an oscillatory motion;
responsive to a determination that the motion detected is an oscillatory motion, controlling a display of the plurality of images captured such that, for each of the plurality of captured images, the apparatus (1) reduces a size of the image to generate a reduced image, (2) determines whether or not the image is similar to a previous one of the plurality of images, and (3) responsive to a determination that the image is similar to a previous one of the plurality of images, superimposes the reduced image on the previous one of the plurality of images on the display, and otherwise, responsive to a determination that the image is not similar to a previous one of the plurality of images, (A) determines whether or not the display has a vacant peripheral portion on which the reduced image can be displayed and (B) responsive to a determination that the display has a vacant peripheral portion on which the reduced image can be displayed, displays the reduced image on the vacant peripheral portion and otherwise, responsive to a determination that the display has no vacant peripheral portion on which the reduced image can be displayed, displays the reduced image in association with a group of one or more images already displayed.

14. The method of claim 13, further comprising:
detecting a further motion applied, by a user, to the apparatus;
determining, by the apparatus, whether or not the further motion detected is a side tap motion; and
responsive to a determination that the further motion detected is a side tap motion, the apparatus arranges the latest N×N of the plurality of images captured in a matrix, where N is an integer of at least 2.

* * * * *